US012626324B2

(12) United States Patent
Langtind et al.

(10) Patent No.: US 12,626,324 B2
(45) Date of Patent: May 12, 2026

(54) GRAPHICS PROCESSING SYSTEMS

(71) Applicant: Arm Limited, Cambridge (GB)

(72) Inventors: Frank Klaeboe Langtind, Melhus (NO); Andreas Due Engh-Halstvedt, Trondheim (NO)

(73) Assignee: Arm Limited, Cambridge (GB)

( * ) Notice: Subject to any disclaimer, the term of this patent is extended or adjusted under 35 U.S.C. 154(b) by 232 days.

(21) Appl. No.: 18/499,029

(22) Filed: Oct. 31, 2023

(65) Prior Publication Data

US 2024/0169464 A1     May 23, 2024

(30) Foreign Application Priority Data

Nov. 17, 2022     (GB) ...................................... 2217231

(51) Int. Cl.
    *G06T 1/20*          (2006.01)
    *G06T 11/40*         (2006.01)
(52) U.S. Cl.
    CPC ................ *G06T 1/20* (2013.01); *G06T 11/40* (2013.01)
(58) Field of Classification Search
    CPC .................................. G06T 1/20; G06T 11/40
    See application file for complete search history.

(56) References Cited

U.S. PATENT DOCUMENTS 8,237,725 B1 *     8/2012     Bowman .............. G06T 15/005
                                                    345/530
8,542,247 B1     9/2013     Hakura et al.

| | | |
|---|---|---|
| 10,062,140 B2 | 8/2018 | Kakarlapudi et al. |
| 10,607,400 B2 | 3/2020 | Kakarlapudi et al. |
| 2008/0007559 A1 | 1/2008 | Kalaiah et al. |
| 2010/0164983 A1 | 7/2010 | Lawrence et al. |

(Continued)

FOREIGN PATENT DOCUMENTS

| EP | 2854401 | 4/2015 |
|---|---|---|
| GB | 2527822 | 1/2016 |

(Continued)

OTHER PUBLICATIONS

Search Report dated Feb. 5, 2025, GB Patent Application No. 2414351.3.

(Continued)

*Primary Examiner* — Kee M Tung
*Assistant Examiner* — Khoa Vu
(74) *Attorney, Agent, or Firm* — Pearl Cohen Zedek Latzer Baratz LLP

(57)          ABSTRACT

When generating a graphics processing output by assembling a sequence of one or more of primitives to be processed from a set of vertex indices provided for the output based on primitive configuration information provided for the output, one or more vertex packets are generated using the vertex indices for the assembled primitives, each vertex packet comprising a plurality of vertices of the assembled primitives. After a threshold number of vertices have been allocated to a vertex packet, vertex attribute processing for the vertices of the vertex packet is triggered, to thereby generate a vertex packet comprising processed vertex attributes for the vertices of the vertex packet. The assembled primitives and the generated vertex packets are then provided to later stages of the graphics processing pipeline for processing.

18 Claims, 12 Drawing Sheets

(56) References Cited

U.S. PATENT DOCUMENTS

| | | | |
|---|---|---|---|
| 2010/0302246 A1 | 12/2010 | Jiao et al. | |
| 2011/0148901 A1 | 6/2011 | Adams et al. | |
| 2015/0325037 A1 | 11/2015 | Lentz et al. | |
| 2016/0035128 A1 | 2/2016 | Zhao et al. | |
| 2016/0350892 A1 | 12/2016 | Zhong et al. | |
| 2017/0330372 A1* | 11/2017 | Kakarlapudi | G06T 11/40 |
| 2019/0012829 A1* | 1/2019 | Engh-Halstvedt | G06T 1/20 |
| 2021/0158598 A1* | 5/2021 | Bratt | G06T 15/005 |

FOREIGN PATENT DOCUMENTS

| | | | |
|---|---|---|---|
| GB | 2545457 A | 6/2017 | |
| GB | 2550358 A | 11/2017 | |
| JP | 2005031878 A | 3/2005 | |
| WO | WO2013089751 A1 | 6/2013 | |

OTHER PUBLICATIONS

GB Combined Search and Examination Report dated Nov. 16, 2016, UK Patent Application No. GB1608572.2.

GB Search Report dated Jan. 9, 2015, UK Patent Application No. GB1411892.1.

GB Examination Report dated Sep. 9, 2019, UK Patent Application No. GB1608572.2.

Non-final Office Action dated Jun. 29, 2018, U.S. Appl. No. 15/594,969, filed May 15, 2017.

Response to Office Action dated Dec. 31, 2018, U.S. Appl. No. 15/594,969, filed May 15, 2017.

Final Office Action dated Apr. 1, 2019, U.S. Appl. No. 15/594,969, filed May 15, 2017.

Response to Final Office Action dated Sep. 30, 2019, U.S. Appl. No. 15/594,969, filed May 15, 2017.

Notice of Allowance dated Nov. 27, 2019, U.S. Appl. No. 15/594,969, filed May 15, 2017.

Combined Examination and Search Report dated Mar. 30, 2016, UK Patent Application No. GB1522262.3.

English Abstract of JP2005031878A published Mar. 2, 2005, 1 page.

Non-final Office Action dated Dec. 4, 2017, U.S. Appl. No. 15/369,778, filed Dec. 5, 2016.

Response to Office Action dated Apr. 4, 2018, U.S. Appl. No. 15/369,778, filed Dec. 5, 2016.

Notice of Allowance dated May 2, 2018, U.S. Appl. No. 15/369,778, filed Dec. 5, 2016.

U.S. Appl. No. 19/343,432, filed Sep. 29, 2025.

* cited by examiner

11 Scene data

12 Vertex processing

13 Primitive assembly

14 Rasterization

15 Fragment processing

16 Image

2

30   Scene data

31   Early primitive assembly

32   Vertex processing

33   Late primitive assembly

34   Tiling

35   Rasterisation

36   Fragment processing

37   Tile buffer

38   Output data

Vertex packet

| | 511 | 384 | 383 | 256 | 255 | 128 | 127 | 0 |
|---|---|---|---|---|---|---|---|---|
| 0 | vertex 3 position | | vertex 2 position | | vertex 1 position | | vertex 0 position | |
| 64 | vertex 7 position | | vertex 6 position | | vertex 5 position | | vertex 4 position | |
| 128 | vertex 11 position | | vertex 10 position | | vertex 9 position | | vertex 8 position | |
| 192 | vertex 15 position | | vertex 14 position | | vertex 13 position | | vertex 12 position | |
| 256 | vertex 19 position | | vertex 18 position | | vertex 17 position | | vertex 16 position | |
| 320 | vertex 23 position | | vertex 22 position | | vertex 21 position | | vertex 20 position | |
| 384 | vertex 27 position | | vertex 26 position | | vertex 25 position | | vertex 24 position | |
| 448 | vertex 31 position | | vertex 30 position | | vertex 29 position | | vertex 28 position | |
| 512 | vertex 35 position | | vertex 34 position | | vertex 33 position | | vertex 32 position | |
| 576 | vertex 39 position | | vertex 38 position | | vertex 37 position | | vertex 36 position | |
| 640 | vertex 43 position | | vertex 42 position | | vertex 41 position | | vertex 40 position | |
| 704 | vertex 47 position | | vertex 46 position | | vertex 45 position | | vertex 44 position | |
| 768 | vertex 51 position | | vertex 50 position | | vertex 49 position | | vertex 48 position | |
| 832 | vertex 55 position | | vertex 54 position | | vertex 53 position | | vertex 52 position | |
| 896 | vertex 59 position | | vertex 58 position | | vertex 57 position | | vertex 56 position | |
| 960 | vertex 63 position | | vertex 62 position | | vertex 61 position | | vertex 60 position | |

FIG. 6

Vertex packet

| | 511 — 384 | 383 — 256 | 255 — 128 | 127 — 0 |
|---|---|---|---|---|
| 0 | vertex 3 position | vertex 2 position | vertex 1 position | vertex 0 position |
| 64 | vertex 3 attributes | vertex 2 attributes | vertex 1 attributes | vertex 0 attributes |
| 128 | vertex 7 position | vertex 6 position | vertex 5 position | vertex 4 position |
| 192 | vertex 7 attributes | vertex 6 attributes | vertex 5 attributes | vertex 4 attributes |
| 256 | vertex 11 position | vertex 10 position | vertex 9 position | vertex 10 position |
| 320 | vertex 11 attributes | vertex 10 attributes | vertex 9 attributes | vertex 10 attributes |
| 384 | vertex 15 position | vertex 14 position | vertex 13 position | vertex 12 position |
| 448 | vertex 15 attributes | vertex 14 attributes | vertex 13 attributes | vertex 12 attributes |
| 512 | vertex 19 position | vertex 18 position | vertex 17 position | vertex 16 position |
| 576 | vertex 19 attributes | vertex 18 attributes | vertex 17 attributes | vertex 16 attributes |
| 640 | vertex 23 position | vertex 22 position | vertex 21 position | vertex 20 position |
| 704 | vertex 23 attributes | vertex 22 attributes | vertex 21 attributes | vertex 20 attributes |
| 768 | vertex 27 position | vertex 26 position | vertex 25 position | vertex 24 position |
| 832 | vertex 27 attributes | vertex 26 attributes | vertex 25 attributes | vertex 24 attributes |
| 896 | vertex 31 position | vertex 30 position | vertex 29 position | vertex 28 position |
| 960 | vertex 31 attributes | vertex 30 attributes | vertex 29 attributes | vertex 28 attributes |
| 1024 | vertex 35 position | vertex 34 position | vertex 33 position | vertex 32 position |
| 1088 | vertex 35 attributes | vertex 34 attributes | vertex 33 attributes | vertex 32 attributes |
| 1152 | vertex 39 position | vertex 38 position | vertex 37 position | vertex 36 position |
| 1216 | vertex 39 attributes | vertex 38 attributes | vertex 37 attributes | vertex 36 attributes |
| 1280 | vertex 43 position | vertex 42 position | vertex 41 position | vertex 40 position |
| 1344 | vertex 43 attributes | vertex 42 attributes | vertex 41 attributes | vertex 40 attributes |
| 1408 | vertex 47 position | vertex 46 position | vertex 45 position | vertex 44 position |
| 1472 | vertex 47 attributes | vertex 46 attributes | vertex 45 attributes | vertex 44 attributes |
| 1536 | vertex 51 position | vertex 50 position | vertex 49 position | vertex 48 position |
| 1600 | vertex 51 attributes | vertex 50 attributes | vertex 49 attributes | vertex 48 attributes |
| 1664 | vertex 55 position | vertex 54 position | vertex 53 position | vertex 52 position |
| 1728 | vertex 55 attributes | vertex 54 attributes | vertex 53 attributes | vertex 52 attributes |
| 1792 | vertex 59 position | vertex 58 position | vertex 57 position | vertex 56 position |
| 1856 | vertex 59 attributes | vertex 58 attributes | vertex 57 attributes | vertex 56 attributes |
| 1920 | vertex 63 position | vertex 62 position | vertex 61 position | vertex 60 position |
| 1984 | vertex 63 attributes | vertex 62 attributes | vertex 61 attributes | vertex 60 attributes |

FIG. 11

GRAPHICS PROCESSING SYSTEMS

BACKGROUND

The technology described herein relates to graphics processing systems and in particular to methods of and apparatus for preparing primitives to be processed when rendering an output in a graphics processing system.

Computer graphics systems typically produce their output, such as frames for display, by processing so-called primitives, which are usually simple polygons such as triangles. Each primitive is normally defined by a set of vertices (e.g. three vertices in the case of triangular primitive).

Typically the set of vertices to be used for a given graphics processing output (e.g. frame for display) will be stored as a set of vertex data defining the vertices (e.g. the relevant attributes for each of the vertices).

While it would be possible simply to store the vertices to be used for each primitive to be generated in turn (such that, in effect, the set of vertices will correspondingly define the primitives to be processed), it is also known to define the primitives separately in terms of a set of indices that reference the vertices in the set of vertex data. This can then avoid, for example, the need to duplicate vertices in the set of vertex data, as a single vertex entry (vertex) in the set of vertices can be referred to multiple times by reusing the relevant index in the set of indices.

Accordingly, in the case of a typical graphics processing pipeline, the initially provided data for an output to be generated will, inter alia, comprise a set of vertices to be used and processed for generating the output, and a set (sequence) of indices referencing the set of vertices (to, in effect, define how the vertices will be used to form a set of primitives to be processed when generating the output).

Each vertex will have associated with it a set of data (such as position, colour, texture and other attributes) representing the vertex. This "vertex" data is then used when processing a primitive that includes the vertex in order to generate the desired output of the graphics processing system.

Once the vertices and sets of vertex indices for an output have been generated, they can be processed by a graphics processor to generate the desired graphics processing output (render target), such as a frame for display.

This will comprise, inter alia, "assembling" primitives using the vertices based on the set (sequence) of vertex indices, and then processing the so-assembled primitives.

The primitive processing may involve, for example, determining which sampling points of an array of sampling points associated with the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising and rendering processes use the vertex attributes associated with the vertices of the primitive that is being processed. To facilitate this operation at least some of the attributes of the vertices defined for the given graphics processing output are usually subjected to an initial so-called "vertex shading" (vertex processing) operation, before the primitives are, e.g. rasterised and rendered. This "vertex shading" operation operates to transform the attributes for a vertex into a desired form for the subsequent graphics processing operation(s). This may comprise, for example, transforming vertex position attributes from the model or user space that they are initially defined in, to the screen space that the output of the graphics processing is to be displayed in.

A graphics processing pipeline executed by a graphics processor will typically therefore include a vertex processing stage (a vertex shader) that executes vertex processing (shading) computations on initial vertex attribute values defined for the vertices so as to generate a desired set of output vertex attributes (i.e. appropriately "shaded" attributes) for use in the subsequent processing stages of the graphics processing pipeline.

There will then be an appropriate "primitive assembly" operation that "assembles" the primitives that are to be processed by the graphics processing pipeline from the provided indices and vertices, e.g. in accordance with a defined primitive type or types that are to be assembled using the provided indices and vertices.

The so-assembled primitives will then be processed, e.g. rasterised and rendered.

FIG. 1 illustrates this graphics processing sequence when generating an output.

As shown in FIG. 1, for an output to be generated, a set of scene data 11, including, inter alia, a set of vertices, and a set of indices defining primitives to be processed for the output and referencing the set of vertices, is provided.

The vertices then undergo appropriate vertex processing (shading) 12, e.g. to transform the positions for the vertices from "model" space to "screen" space.

There is then a primitive assembly stage 13 which takes the indices and the processed vertices and assembles primitives for processing using the indices and the vertices, e.g. in accordance with information indicating how the primitives are to be assembled using the indices (e.g. whether primitives in the form of simple triangles, triangle strips, or triangle fans, etc., should be generated for processing).

The assembled primitives are then rasterised 14 to generate appropriate graphics fragments for processing, and the fragments generated by the rasteriser are then processed appropriately (rendered) 15 to provide the final output, e.g. image 16.

The Applicants believe that there remains scope for improvements to the operation of such graphics processing.

BRIEF DESCRIPTION OF THE DRAWINGS

Embodiments of the technology described herein will now be described by way of example only and with reference to the accompanying drawings, in which:

FIG. 6 shows an example vertex packet in an embodiment of the technology described herein;

FIG. 11 shows an example vertex packet in an embodiment of the technology described herein;

Like reference numerals are used for like features in the Figures, where appropriate.

DETAILED DESCRIPTION

Figure 1:
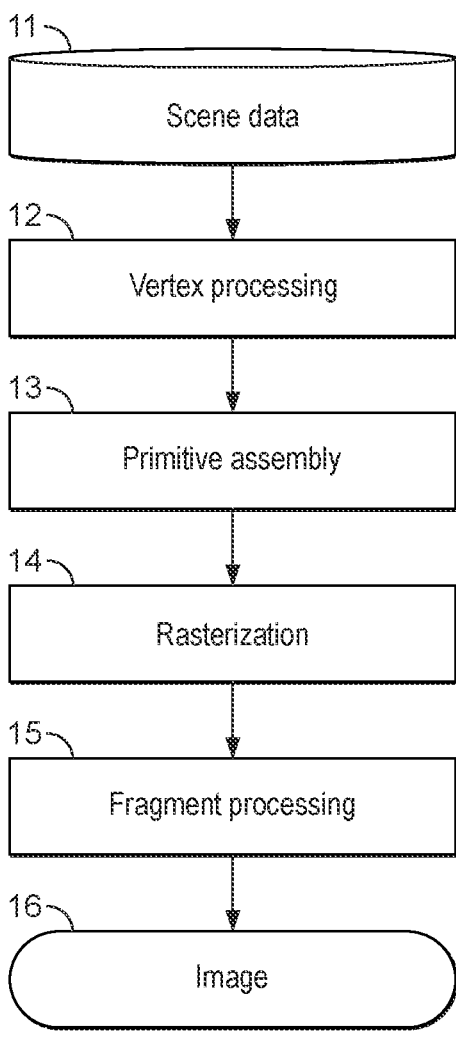
FIG. 1 shows an exemplary sequence of graphics processing.

In an embodiment, the technology described herein comprises a method of operating a graphics processor that executes a graphics processing pipeline to generate an output, in which a set of vertices to be used for primitives to be processed when generating the output, each vertex having associated with it a set of one or more vertex attributes, together with a set of vertex indices referencing vertices in the set of vertices and primitive configuration information indicating how the vertex indices are to be assembled into primitives for processing when generating the output, are provided; the method comprising:

assembling a sequence of one or more of primitives to be processed when generating the output from the set of vertex indices provided for the output based on the primitive configuration information provided for the output, each assembled primitive of the sequence of assembled primitives comprising an identifier for the primitive and a set of one or more vertex indices for the primitive;

generating one or more vertex packets using the vertex indices for the assembled primitives, each vertex packet comprising a plurality of vertices of the assembled primitives;

wherein the generating one or more vertex packets using the vertex indices for the assembled primitives comprises:

allocating vertices for assembled primitives to a vertex packet until a threshold number of vertices have been allocated to the vertex packet; and triggering vertex attribute processing for the vertices of the vertex packet, to thereby generate a vertex packet comprising processed vertex attributes for the vertices of the vertex packet;

and providing the assembled primitives and the generated vertex packets comprising the processed vertex attributes to later stages of the graphics processing pipeline that is being executed by the graphics processor for processing.

In another embodiment, the technology described herein comprises a graphics processor operable to execute a graphics processing pipeline to generate an output; the graphics processor comprising:

a primitive assembly circuit configured to generate a sequence of one or more of primitives to be processed when generating an output from a set of vertex indices provided for the output, the set of vertex indices referencing vertices in a set of vertices provided for the output, each vertex having associated with it a set of one or more vertex attributes, based on primitive configuration information provided for the output, the primitive configuration information indicating how the vertex indices are to be assembled into primitives for processing when generating the output, each assembled primitive of the sequence of assembled primitives comprising an identifier for the primitive and a set of one or more vertex indices for the primitive;

a vertex packet generating circuit configured to generate one or more vertex packets using the vertex indices for the assembled primitives, each vertex packet comprising a plurality of vertices of the assembled primitives;

wherein the vertex packet generating circuit is configured to generate the one or more vertex packets using the vertex indices for the assembled primitives by:

allocating vertices for assembled primitives to a vertex packet until a threshold number of vertices have been allocated to the vertex packet; and triggering vertex attribute processing for the vertices of the vertex packet, to thereby generate a vertex packet comprising processed vertex attributes for the vertices of the vertex packet;

and a processing circuit configured to provide the assembled primitives and the generated vertex packets comprising the processed vertex attributes to later stages of the graphics processing pipeline that is being executed by the graphics processor for processing.

The technology described herein relates to graphics processors and graphics processing in which graphics primitives for processing are assembled from, inter alia, a set of vertex indices defined for an output to be generated.

In the technology described herein, the vertices of the assembled primitives are organised into respective vertex packets, and the vertex attribute processing (shading) is triggered for respective packets of plural vertices of the assembled primitives together (in contrast, for example, to being triggered on an individual vertex by vertex basis).

Thus, in the technology described herein, and in contrast to conventional graphics processing pipelines as illustrated in FIG. 1 and discussed above, for example, the vertex attributes for the primitives to be processed are processed (shaded)) after the primitives have been assembled (and based on the vertex indices for the assembled primitives).

This can, for example, avoid performing vertex attribute processing for vertices that will not in fact be used for assembled primitives (and so will not in fact need to be processed for the output in question).

Correspondingly, vertex packets comprising the processed (shaded) vertex attributes for the plural vertices of a vertex packet are provided for use by later stages of the graphics processing pipeline.

As will be discussed further below, this then allows the processed vertex attributes to be tracked and managed on a packet by packet basis in subsequent stages of the graphics processing pipeline, rather than, for example, having to track and manage individual vertices. For example, rather than having to track the lifetimes of the individual vertices in a vertex packet, the lifetime of the packet as a whole can be tracked. This can then significantly reduce the processing and resources that are needed in that regard.

The set of vertices to be used for primitives to be processed when generating the output, the set of vertex indices referencing vertices in the set of vertices, and the primitive configuration information indicating how the vertex indices are to be assembled into primitives for processing when generating the output, that are used and provided in the technology described herein may be provided in any suitable and desired manner. They may, for example, be provided by an application that requires the graphics processing in question, and/or be generated and then provided by a driver for the graphics processor, e.g., and in an embodiment, in response to commands and data received from an application that requires graphics processing.

The vertices, vertex indices and primitive configuration information can be made available to the graphics processor in any suitable and desired manner. For example, and in an embodiment, the vertices and vertex indices at least may be stored (e.g., and in an embodiment, as appropriate arrays) in memory from where they can then be fetched by the graphics processor for use. The primitive configuration information may equally be stored in memory for use by the graphics processor. It may, for example, be provided in the form of a descriptor associated with and for the output to be generated.

The sets of vertices and vertex indices that are being processed can be any desired and suitable sets of vertices and vertex indices to be processed when generating an output. Thus the sets of vertices and vertex indices may comprise (and in an embodiment do comprise) the entire set of vertices and the entire set of vertex indices defined for a given graphics processing output, such as for a frame to be displayed. They may also comprise a set of vertices and set of vertex indices that is defined for less than the entire output, such as a set of vertices and a set of vertex indices defined for a given draw call, and/or for a tile to be generated (in a tile-based graphics processor and graphics processing pipeline). In an embodiment, the set of vertices and set of vertex indices are a set of vertices and a set of vertex indices defined for a draw call.

Correspondingly, the output that is being generated may comprise an entire (complete), e.g. frame, or only part of an overall output (e.g. frame), such as a (rendering) tile.

Where the sets of vertices and vertex indices are less than the entire sets of vertices and vertex indices defined for a given output, then in an embodiment the operation in the manner of the technology described herein is repeated for each set of vertices and vertex indices (e.g., and in an embodiment, for each draw call and/or tile) for the output. Correspondingly, the process of the technology described herein is in an embodiment repeated for plural, and in an embodiment for each, output to be generated, e.g. for successive frames in a sequence of output frames, and/or for each tile making up an overall output, e.g. frame.

Each vertex in the set of vertices will have and has associated with it a set of one or more vertex attributes (vertex attribute data (values)). These vertex attributes can be any suitable and desired attributes that may be associated with a vertex, such as one or more of, and in an embodiment all of: position (e.g. x, y, z, w coordinates/values for the vertex), colour (e.g. RGB values for the vertex), transparency (an alpha value for the vertex), etc. In an embodiment, each vertex has associated with it a position (position data) and one or more other, non-position attributes (data) (varyings), e.g. defining colour, light, normal, texture coordinates, etc, for the vertex in question.

There may also be some attributes that are "per-primitive" (but which are determined in the same way in the vertex shader (per vertex)), with the attribute(s) from the "provoking" vertex then being used for the primitive. Examples of these types of attributes are: primitive ID; layer ID; point size; and a primitive variable rate shading value. The technology described herein can and in an embodiment does, handle such "primitive" attributes in the same way (where it is appropriate to do that).

Each vertex index in the set of vertex indices for the output to be generated will identify (index) a corresponding vertex that is provided in the set of vertices for the output. Thus the vertices will each be identifiable by a corresponding index that (uniquely) identifies the vertex in the set of vertices. In an embodiment the indices are the "input" indices for the vertices as provided (e.g. by the application/driver) prior to any processing of the vertices.

The same vertex index may appear more than once in the set of vertex indices for the output, and/or it may be the case that some vertices in the set of vertices for the output will not in fact be included in the set of indices for the output.

The set of vertex indices for the output to be generated is in an embodiment provided to the primitive assembly process as an appropriate sequence of vertex indices, in the order in which the indices are to be used for primitives for the output.

The primitive configuration information that is provided for the output can be any suitable and desired information that is indicative of, and that defines, how the vertex indices are to be used for (configured into) the primitives for processing for the output. In an embodiment, the primitive configuration information indicates the type of primitives to be assembled using the sequence of vertex indices, i.e. whether the primitives should, for example, be in the form of triangles, triangle strips, triangle fans, or other forms of configuration (such as lines or points).

The primitive assembly operation and circuit in the technology described herein can use the set of vertex indices, together with the primitive configuration information, defined for the output being generated, to assemble the primitives that are then to be processed when generating the output in any suitable and desired manner.

In an embodiment, the primitive assembly process and circuit works its way through the sequence of vertex indices defined for the output (in the vertex index sequence order), and assembles primitives therefrom based on the configuration information, with each primitive comprising an appropriate sequence of indices (for the primitive configuration required) from the sequence of vertex indices for the output.

Thus the primitive assembly process/circuit should, and in an embodiment does, fetch vertex indices from the set (array) of vertex indices in their (desired) sequence order, and "assemble" respective sub-sequences of the fetched vertex indices corresponding to primitives based on the primitive configuration information. Correspondingly, the primitive assembly process in an embodiment includes a step of fetching the vertex indices from the set (array) of vertices and outputting the vertices as a stream of vertices in the (desired) vertex index order to the primitive assembly process for assembling into primitives. Correspondingly, the graphics processor, and in an embodiment the primitive assembly circuit, in an embodiment includes an index fetcher (an index fetching circuit) that is operable to read and fetch indices from the (stored) set of indices (from the index array) and output a sequence (stream) of indices for assembling into primitives.

For example, where the primitive configuration indication indicates that primitives in the form of triangles should be generated, the primitive assembly process and circuit will output respective sets of three successive indices from the sequence of vertex indices (thereby providing a sequence of triangles for processing). For triangle strips, again the sequence of assembled primitives will comprise respective sets of three indices from the sequence of vertex indices, but in that case each successive triangle will reuse the last two indexes in the previous triangle (and the index order will, e.g., be reversed)). Other primitive types will be configured correspondingly.

The primitive assembly operation (circuit) is in an embodiment configured to output "complete" primitives only (i.e. sequences of the vertex indices for "complete" primitives only). Thus where only an "incomplete" or "degenerate" primitive can be assembled from a given set of indices from the index sequence, in an embodiment no primitive is output by the primitive assembly process/circuit.

Thus any "faulty" (incomplete or degenerate) primitives are in an embodiment "removed" at the primitive assembly stage, thereby avoiding performing vertex (attribute) fetching and processing for vertices that are only included in degenerate or incomplete primitives.

Correspondingly, the primitive assembly operation (circuit) is in an embodiment able to recognise and discard any "faulty" (incomplete or degenerate) primitives, such that it will then output only complete primitives for further processing. This may be done, for example, and in an embodiment, in accordance with the graphics API in question.

In an embodiment, the primitive assembly operation/circuit is configured to and operable to output "simple" primitives, such as triangles, lines or points. In an embodiment the primitive assembly operation/circuit is operable to convert more complex primitives (such as line strips, line links, triangle strips, triangle fans, quads, quad strips, lines with adjacency, line strips with adjacency, triangles with adjacency and triangle strips with adjacency) into simpler primitives, such as, and in an embodiment, one or more of: triangles, lines or points (which "simpler" primitives are then output by the primitive assembly process/circuit for further processing).

The output of the primitive assembly process (circuit) is a sequence of (plural) primitives to be processed, with each primitive that is output from the primitive assembly process comprising an identifier for the primitive and a sequence of vertex indices for the primitive.

The identifier for each output primitive can be any suitable and desired identifier that can be used to uniquely identify the primitive within, e.g., and in an embodiment, the set of primitives in question (e.g. the set of primitives for the output in question). In an embodiment, the primitives are simply numbered in sequence (by the primitive assembly process/circuit) with the sequence number for each primitive acting as its identifier. Other arrangements would, of course, be possible.

In an embodiment, the primitive identifiers assigned by the primitive assembly process (circuit) may be overridden by a later identifier that is generated for and/or assigned to the primitive in question, for example as a result of vertex (attribute) processing. In a such embodiment, the primitives output by the primitive assembly process (circuit) may also have associated with them a flag to indicate whether the identifier allocated to the primitive by the primitive assembly process can be overridden by another (e.g. a later) primitive identifier or not.

The primitive assembly process (circuit) can also output other information (e.g. state) for a (and each) primitive, if desired. (However at this stage the primitive assembly process (circuit) should not, and in an embodiment does not, output any vertex attributes in association with the assembled primitives.)

Thus, in an embodiment, the primitive assembly process of the technology described herein comprises (and the primitive assembly circuit is correspondingly configured to) fetching indices from a sequence of vertex indices defined for the output being generated in the vertex index sequence order, organising (e.g. dividing) the fetched vertex indices into respective sub-sequences of vertex indices corresponding to complete primitives based on the primitive configuration information, and outputting each respective sub-sequence of vertex indices corresponding to a complete primitive as an assembled primitive in association with, at least, an identifier for the primitive (which in an embodiment is a respective sequence number for the primitive).

In the technology described herein, as discussed above, as well as assembling complete primitives for the output being generated, vertex packets comprising vertices of the assembled primitives are also generated. Each vertex packet in this regard should, and in an embodiment does, comprise a plurality of vertices of the assembled primitives (except, for example, in the case where there is a final, single vertex remaining to be allocated to a new vertex packet). A vertex packet may comprise any suitable and desired (plural) number of vertices.

In an embodiment, a (and each) vertex packet also has associated with it an appropriate identifier for the vertex packet (that at least uniquely identifies the vertex packet within the set of vertex packets for the render output in question), such as, and in an embodiment, an appropriate index (e.g. sequence number) for the vertex packet. In an embodiment, each vertex within a vertex packet is also allocated an identifier for the vertex within the vertex packet (that at least uniquely identifies the vertex within the set of vertices of the vertex packet), such as, and in an embodiment, an appropriate index (e.g. sequence number) for the vertex within the vertex packet.

Vertices are added to a vertex packet up to a threshold number of vertices. The threshold number of vertices should, and in an embodiment does, accordingly correspond to a maximum permitted number of vertices that may be allocated to (included in) a vertex packet. (Correspondingly, once the threshold number of vertices have been added to a vertex packet, (in an embodiment) no further vertices are added to the vertex packet.)

In an embodiment, each vertex packet can comprise up to the same threshold (permitted maximum) number of vertices, such as, for example, 16, 32 or 64 vertices.

It will be appreciated in this regard that whilst vertices will normally be allocated to a vertex packet until the threshold number of vertices has been allocated to the vertex packet (i.e. the vertex packet is "full"), it may be the case that for the final (end) vertex packet that is being generated for a given output in the manner of the technology described herein, there will not be enough vertices (remaining in the sequence of vertices, e.g. for a draw call) to be allocated to that final vertex packet for it to reach the threshold number of vertices. Thus, in embodiments, it is permissible to generate a packet with fewer than the threshold number of vertices, in an embodiment when there are fewer vertices remaining in the sequence of vertices to be processed than the threshold number of vertices for a "full" a packet.

Vertices for assembled primitives may be allocated to a vertex packet (and to the vertex packets) in any suitable and desired manner.

In an embodiment, vertices of assembled primitives are allocated to a vertex packet in turn, one after another, until the threshold number of vertices is reached for the vertex packet in question, with a new vertex packet then being started thereafter for any further vertices of assembled primitives. In an embodiment, vertices for assembled primitives are allocated to packets based on (according to) the order in which they appear in the sequence of assembled primitives.

Thus, in an embodiment, the generating of the vertex packets using the vertex indices for the assembled primitives comprises allocating vertices for assembled primitives to a first vertex packet until the threshold number of vertices have been allocated to the first vertex packet, and once the threshold number of vertices have been allocated to the first vertex packet, thereafter starting a new vertex packet (and allocating any further vertices for assembled primitives to the new vertex packet) (again until that vertex packet is "full") (and so on).

It would be possible simply to allocate vertices for assembled primitives to vertex packets as the primitives are assembled, such that the vertices are simply allocated to vertex packets as they appear in assembled primitives.

However, in an embodiment, the allocating of vertices of assembled primitives to a vertex packet (and to the vertex packets) is configured so as to try to avoid duplication of vertices at least within the same vertex packet.

The Applicants have recognised in this regard that primitives in a sequence of primitives being assembled for a render output may use the same vertices, such that there may be duplication of vertices in the set of vertices being used for different assembled primitives. It would be possible in this regard simply to correspondingly duplicate the duplicated vertices in the assembled primitives in the vertex packets, but in an embodiment, duplication of vertices in a vertex packet (and at least in the same vertex packet) is in an embodiment (attempted to be) avoided.

Thus, in an embodiment, the generation of the vertex packets comprises (and the vertex packet generating circuit is correspondingly configured to), when a new vertex for an assembled primitive is to be allocated to a vertex packet, first determining whether the vertex is already present in (has already been allocated to) a vertex packet. Correspondingly, in an embodiment, when it is determined that a vertex is not already present in (allocated to) a vertex packet, the vertex is allocated (added) to a (the current) vertex packet, but when it is determined that the vertex is already present in a vertex packet, the vertex is not (is other than) allocated (added) to a (the current) vertex packet.

This will then help to avoid duplication of vertices within the generated vertex packets.

To facilitate this operation, it is accordingly and correspondingly in an embodiment tracked which vertices have been included in a vertex packet. Thus, in an embodiment, the generation of vertex packets comprises (and the vertex packet generating circuit is correspondingly configured to) keeping track of the vertices that have been allocated to a vertex packet, and, in an embodiment, using that tracking to determine whether a vertex (potentially) to be allocated to a vertex packet is already present in a vertex packet or not.

Thus, in an embodiment, the generating of a vertex packet further comprises associating with the vertex packet, tracking information indicative of the vertices that have been allocated to the vertex packet.

The tracking information to (try to) avoid duplication of vertices in vertex packets can take any suitable and desired form and be used in any suitable and desired manner. In an embodiment, the tracking uses the vertex indices (the indices of the vertices) (that have been included in the assembled primitives), such that, for example and in an embodiment, a record of the indices of all the vertices that have been included in a vertex packet is maintained for a vertex packet, and then the index of a new vertex to (potentially) be allocated to a vertex packet is compared to the record of the vertex indices already present in a vertex packet, to determine whether the vertex is already present in a vertex packet or not.

Thus, in an embodiment, a (and each) vertex packet, at least initially, has associated with it the indices of the vertices that have been allocated to the packet (and the vertex packet generation correspondingly in an embodiment comprises, when a vertex has been allocated to a vertex packet, also associating with the vertex packet the vertex index of the allocated vertex).

Vertices of assembled primitives (and in an embodiment the indices of vertices of assembled primitives) output by the primitive assembly operation are in an embodiment then "looked up" (checked) in a vertex packet, and when the vertex (index) being looked up is not already present in a (checked) vertex packet, the vertex will be allocated to the (current) vertex packet (but when the vertex (index) being looked up is already present in a (checked) vertex packet, the (new) duplicated vertex (having the same index) will not be allocated to the (current) vertex packet (the vertex packet that is currently being generated)).

It would be possible in this regard simply to check whether a new vertex to (potentially) be allocated to a vertex packet is already present in the "current" vertex packet (the vertex packet that is currently being generated) (and in one embodiment that is what is done). In this case therefore, it will be determined whether a vertex for an assembled primitive has already been included in a single (the current) vertex packet or not.

In an embodiment, the determination of whether a vertex has already been allocated to a vertex packet considers a plurality of vertex packets (i.e. determines whether the vertex has already been allocated to any one of a plurality of vertex packets). For example, and in an embodiment, the allocation process could consider in this regard both the packet that is currently being generated, and the immediately preceding vertex packet or packets.

In an embodiment, both the current and one or more of the immediately preceding vertex packets are considered. In embodiments, up to, e.g., and in an embodiment, four vertex packets can be considered in this regard (e.g. the current and the immediately preceding three vertex packets). Other arrangements would, of course, be possible.

In this case therefore, it will correspondingly be tracked which vertices have been allocated to plural vertex packets (in an embodiment the current vertex packet and one or more previous vertex packets), with that tracking information then being used to determine whether a new vertex has already been allocated to one of those existing vertex packets or not.

The Applicants have recognised in this regard that it may be relatively likely that assembled primitives that are close to each other in the sequence of the assembled primitives will share vertices, such that primitives whose vertices are to be allocated to "adjacent" vertex packets may be likely to share vertices, such that there may be likely to be duplication of vertices between adjacent vertex packets, such that it is beneficial to try to track and avoid such duplication.

However, for assembled primitives in the sequence of assembled primitives that are further apart in that sequence, there may be less likelihood of those primitives using the same vertices, such that it is not so efficient or necessary to seek to avoid duplication of vertices in vertex packets for primitives that are spaced further apart in the sequence of assembled primitives. Accordingly, where the vertex "duplication" check is performed in respect of plural vertex packets, that is in an embodiment still only performed across and for a more limited number of vertex packets in the sequence of vertex packets, such as, and in an embodiment, for no more than four vertex packets in the sequence of vertex packets.

Correspondingly, it could be the case that if a vertex is used again in an assembled primitive in the sequence of assembled primitives that falls outside the vertex packet "tracking window" from when that vertex previously appeared, then the vertex will be included in a vertex packet again (but as discussed above, the Applicants believe that this may be relatively uncommon, and that using a more limited "tracking window" of, for example, up to four vertex packets, should be sufficient to avoid most (or at least sufficient) duplication of vertices within the generated vertex packets).

In an embodiment, any particular assembled primitive is guaranteed to have its vertices stored within the vertex packet "tracking window" of, for example, four vertex packets (in an embodiment such that any particular primitive is guaranteed to have its vertices stored within one or more of a particular, in an embodiment selected, in an embodiment predetermined, (maximum) number of (e.g. four) successive vertex packets).

In an embodiment (for example to assist with tracking which vertices have been allocated to packets within the "tracking window", and avoiding duplication of vertices within the "tracking window") a queue of plural vertex packets is maintained while the vertices for assembled primitives are being allocated to vertex packets, with the packets in the queue being generated in turn. In an embodiment the queue comprises a particular, in an embodiment selected, in an embodiment predetermined maximum number of packets (for example corresponding to the "tracking window", e.g. four packets). A (any) determination of whether a vertex has already been allocated to a vertex packet in an embodiment considers all the vertex packets in the queue.

In an embodiment, when a new vertex packet is started (e.g., and in an embodiment, because the previous vertex packet has reached the threshold number of allocated vertices), that new vertex packet is added to the end of the queue, with the oldest vertex packet (at the head of the queue) then being removed from the queue and sent for vertex attribute processing.

Correspondingly, any determination of whether a vertex has already been allocated to a vertex packet in an embodiment considers all the vertex packets in the queue (but not any vertex packets that have been sent (evicted) from the queue).

Other arrangements would, of course, be possible.

In the technology described herein, vertex attribute processing is triggered for the vertices of a (each) the vertex packet, to thereby generate a vertex packet (vertex packets each) comprising processed vertex attributes for the vertices of the vertex packet.

As discussed above, in graphics processing it may be, and typically can be, the case that at least some of the initially defined attribute values for a vertex need to be processed in some way before they are used by the graphics processor when generating an output. For example, positions defined for a vertex may need to be transformed from the (e.g. model) space that they are initially defined in, into the (e.g. screen) space that the output will be generated for (and with respect to). This processing of vertex attributes may typically be referred to as "vertex shading".

In the technology described herein, (appropriate) vertex processing (vertex shading) of vertex attributes is performed and triggered for respective vertex packets.

Thus, vertex (attribute) processing (vertex shading) for the attributes of vertices of assembled primitives is triggered on a vertex packet by vertex packet basis, and only for vertices that are allocated to vertex packets.

Correspondingly, in an embodiment, no vertex attribute processing is performed prior to the allocation of a vertex into a vertex packet, i.e. such that any vertex attribute processing is only performed for those vertices that have been allocated to a vertex packet.

This all will then have the effect of performing any vertex attribute processing (vertex shading) for attributes of vertices conditionally, and "on demand", based on, and in dependence upon, whether the vertex is included in a vertex packet (and thus in an assembled primitive) or not.

It would be possible to perform and trigger vertex processing for a vertex packet as a whole after the vertex packet is "full" (has reached the threshold number of vertices) and the generation of that vertex packet has completed. For example, and in embodiments, vertex attribute processing for (all, or at least some) vertices of a vertex packet could be triggered as and when (e.g. immediately) the threshold number of vertices have been allocated to the vertex packet (and in an embodiment this is what is done). In this case therefore, when the final vertex that reaches the threshold number of vertices is allocated to a vertex packet, the vertex attribute processing for the vertices of the vertex packet would at that point then be triggered (i.e. the vertex attribute processing for the vertices the vertex packet would be triggered in response to the vertex packet becoming "full").

Alternatively, processing for vertices of a "full" vertex packet could be triggered at a later point in time (and not immediately (in response to) the vertex packet becoming full). For example, processing for vertices of a vertex packet could be is triggered in response to another vertex packet becoming full (reaching the threshold number of allocated vertices). In other words, in an embodiment, rather than the vertex attribute processing for the vertices of a vertex packet being triggered in response to that vertex packet reaching the threshold number of vertices, instead, the vertex attribute processing for the vertices of the vertex packet is triggered in response to another, different vertex packet reaching the threshold number of vertices. In such embodiments, a queue of "full" vertex packets ready for vertex attribute processing for the vertices of the vertex packets may be maintained, with the vertex attribute processing for the vertices of the vertex packets in the queue in an embodiment then being triggered in turn, as new vertex packets are added to the queue, e.g., and in an embodiment, such that when the youngest vertex packet in the queue becomes full (in response to the youngest vertex packet in the queue becoming full), the vertex attribute processing for the vertices of the oldest vertex packet in the queue is then triggered (and that vertex packet is evicted from the queue).

These arrangements can be implemented and performed in any suitable and desired manner. As noted above, it may be the case that (e.g. for the final (end) vertex packet that is being generated for a given output in the manner of the technology described herein), there will not be enough vertices to be allocated to that final vertex packet for it to reach the threshold number of vertices to thereafter trigger vertex attribute processing for vertices of the vertex packet. Thus, vertex attribute processing for the vertices of a vertex packet may, and in an embodiment is, also triggered in the case where there are no more vertices left to be allocated to a vertex packet (for the render output in question). Thus, the vertex attribute processing for the vertices of a vertex packet, in embodiments, is either triggered after a vertex packet (whether the same or a different vertex packet)

reaches the threshold number of allocated vertices, or there are no more vertices to be allocated to a vertex packet for the render output.

Thus, it would be possible to perform and trigger vertex processing for a vertex packet as a whole after the vertex packet is "full" (has reached the threshold number of vertices) or there are no more vertices left to be allocated to a packet and the generation of that vertex packet has completed, and in embodiments this is done.

However, in embodiments, vertex processing is (additionally or alternatively) performed and triggered (and in an embodiment at least started) for vertices allocated to a packet during generation of the packet (whilst the packet is still tracked by the packet generating circuit), and in an embodiment before the generation of a vertex packet has completed (before the vertex packet is "full"). This may allow vertex processing for vertices of a packet to be performed more quickly (with less delay) than waiting until a packet is "full" before performing and triggering vertex processing. This may accordingly reduce the likelihood of further processing, e.g. which is to be performed for primitives using the vertex packet and which requires the processed vertex attributes, from being stalled.

For example, and in an embodiment, vertex processing may be triggered (and performed) after a, particular, in an embodiment selected, in an embodiment predetermined number of vertices have been allocated to a vertex packet (for example and corresponding to a number of vertices which the graphics processing system can process at the same time, e.g. corresponding to a number of execution threads which are used for performing vertex attribute processing, e.g. 16). In this regard, vertex processing could (and in embodiments is) triggered (and performed) for sub-sets of vertices which are allocated to a packet (each sub-set comprising a particular, in an embodiment selected, in an embodiment predetermined number of vertices, for example and corresponding to a number of execution threads which are used for performing vertex attribute processing). The vertex attribute processing that is triggered for the vertices of a vertex packet (once the vertex packet is full) can comprise any suitable and desired vertex attribute processing that may be performed for the vertices of a vertex packet. In an embodiment, the vertex attribute processing that is triggered for the vertices of the vertex packet comprises performing vertex attribute processing for one or more attributes for the vertices of the vertex packet.

The vertex attributes that are processed for the vertices at this stage can be any suitable and desired vertex attributes (attributes that are associated with the vertices in the set of vertices of the vertex packet). It would be possible in this regard to process all of the attributes (the data values for all of the attributes) associated with each vertex, or only a subset of some but not all of the attributes for the vertices could be processed at this stage (with, e.g., and in an embodiment, the attributes that are not processed at this stage then being processed at a later stage of the graphics processing pipeline).

In an embodiment, only some, but not all, e.g. one, of the attributes, are processed for vertices of a vertex packet before the assembled primitives together with the vertex packets are sent onwards for processing, with one or more other attributes for vertices of the vertex packets (assembled primitives) then being processed at a later stage of the graphics processing pipeline.

In the case where only some but not all of the vertex attributes are processed for the vertices of a vertex packet at this stage, then in an embodiment at least a position is processed. In an embodiment, only a position attribute (the position) is processed for a vertex.

Usually there will only be a single position attribute, consisting of (X, Y, Z, W) components. In this case, the vertex attribute that is processed will comprise (at least, and in an embodiment only) that single position attribute. However, there may also be other position attributes, such as a point size or a line width (e.g. when rendering points and lines), which could be processed as well, if desired.

Thus, in an embodiment, only position attribute(s) are processed at this stage (and thus in an embodiment no varyings are processed at this stage), but it would be possible to process one or more other (non-position) attributes as well as one or more position attributes, if desired. Such (non-position) attributes could, for example, be one or more or all of: line width/point size; a primitive shading rate; layer ID; and primitive ID.

(For any attributes that are not processed at this stage (not subjected to any vertex shading at this stage), those attributes can be, and are in an embodiment subjected to any required vertex shading at a later time, e.g. at the time that they are fetched for use (at the appropriate later stage of the graphics processing pipeline, e.g. where they are fetched for use).)

The vertex attribute processing (vertex shading) that is triggered and performed in this regard can be any suitable and desired vertex attribute processing (vertex shading), e.g., and in an embodiment, in dependence upon the vertex attributes that are being processed.

Thus where, as discussed above, a position is processed for a vertex, then in an embodiment the position (position attribute) is subjected to appropriate processing (vertex shading), e.g., and in an embodiment, to transform the position from the (e.g. model) space that it is initially defined in, to the appropriate (e.g. screen) space for the output that is being generated. Thus, in an embodiment, (any) positions of the vertices that are being processed are subjected to an appropriate processing (vertex shading) operation.

When a vertex attribute is subjected to vertex processing (vertex shading), then the processing of the attribute in an embodiment provides both the processed (shaded) attribute value or values itself, together with any other data values, such as state information, that may be generated as a result of the vertex processing (vertex shading). For example, and in an embodiment, in the case of vertex shading a position (position shading), the position shading operation may also, for example, generate one or more parameters (values), such as one or more of: variable rate shading parameter values, a point size, a line width and/or a layer ID, etc. In this case, these additional parameters are in an embodiment also provided along with the "processed" position. Other arrangements would, of course, be possible.

The actual vertex attribute, e.g. position, processing (shading) can be performed in any suitable and desired manner.

In an embodiment, the graphics processor includes and executes an appropriate vertex attribute processing stage (vertex attribute processing circuit) that is operable and configured to process vertex attributes for vertices defined for a render output, which performs the desired vertex attribute processing. Thus, in an embodiment, the vertex attribute processing stage (circuit) is operable and configured (at least) to process (transform) vertex positions for vertices.

In an embodiment the vertex attribute processing stage (circuit) is operable to, and configured to, execute an appropriate vertex shader (e.g. position shader) to perform the vertex attribute processing (shading), with the result of that vertex shading (e.g. position shading) operation then being stored for the vertex, e.g., and in an embodiment in memory.

Thus, in an embodiment, the graphics processor further comprises one or more execution units (circuits) (shader cores) operable to execute shader programs, including vertex shader programs, to perform processing operations on input data values, and the vertex attribute processing (shading) is performed by the execution unit or units (shader core or cores) executing appropriate vertex shading programs.

The vertex attribute processing for the vertices of a vertex packet should, inter alia, identify the vertices that are to be processed, and the vertex attribute processing that is required for those vertices. In an embodiment an appropriate request or requests for the vertex attribute processing is sent to trigger the desired vertex attribute processing.

Thus, in an embodiment, triggering the vertex attribute processing for a vertex packet comprises triggering the execution of an appropriate vertex shader (program) (e.g. a position shader) to perform the vertex shading, e.g., and in an embodiment by sending a vertex (e.g. position) shading request or requests, to trigger the appropriate vertex (e.g. position) shading operation for the attribute or attributes of the vertices in question, and the storing of the processed vertex attributes (e.g. position) (and any other data generated by the vertex shading), e.g. in memory.

The request(s) for the vertex attribute processing to be performed can take any suitable and desired form. In an embodiment, the request(s) comprises information needed by the graphics processor to be able to carry out the vertex attribute processing operation, such as, for example, and in an embodiment, (at least) the identity of the vertices to be processed, and an indication of the processing to be performed (e.g. shader program to be executed). In an embodiment the request(s) includes information (an indicator) that identifies it as being a request(s) to trigger the vertex attribute processing operation, and/or an identifier that identifies the request(s). The request(s) may also indicate, and/or allow to be determined, the location in memory at which the output (processed/vertex-shaded attribute) data should be stored.

The requesting of the vertex attribute processing for a vertex packet accordingly in an embodiment uses the vertex indices (from the initially provided set of vertex indices for the output in question) for the vertices of the vertex packet to identify those vertices (and accordingly their corresponding vertex attributes), for the vertex processing. This may, and in an embodiment does, use the associated vertex indices indicating which vertices have been allocated to the vertex packet (as discussed above).

Thus the processing of the vertex attributes (the vertex shading) in an embodiment uses the indices of the vertices in a vertex packet, which may be determined, for example, and in an embodiment, from the tracking information that is associated with the vertex packets as they are assembled to track which vertices are present in a vertex packet, to identify and determine the vertices (and the vertex attributes) that are to be processed for a vertex packet.

The request(s) for the vertex attribute processing could be sent directly to an execution unit (shader core) that is configured to execute vertex shading operations. However, in an embodiment, the request(s) is sent to a management circuit of the graphics processor, e.g. that is operable to receive and/or distribute respective processing tasks (jobs) to processing units (functional units) of the graphics processor (which management unit will then issue the vertex shading operation to an available shader processing (execution) core).

In an embodiment, the vertex attribute processing (vertex shading) is performed for plural vertices at a time. For example, and in an embodiment, in the case where the execution units of the graphics processor are operable to execute vertex shading programs for plural vertices together as a group (to execute shader programs for respective groups of plural execution threads (warps), with each execution thread representing a given vertex), then in an embodiment the vertex shading requests for vertices of vertex packets are issued for respective thread groups (warps) as a whole, so that the vertices of a vertex packet are processed as one or more respective (full) thread groups (warps).

The vertex attribute processing itself can be performed in any suitable and desired manner. It will, for example, and in an embodiment, comprise fetching the relevant attributes (e.g. positions) for the vertices of the vertex packet from where they are stored in memory (e.g., and in an embodiment, based on, and using, the vertex indices of the vertices for the vertex packet in question), appropriately processing those vertex attributes (e.g., and in an embodiment, subjecting them to appropriate vertex shading), and then storing the processed attributes (e.g. positions) for the vertices of the vertex packet in association with each other (together), e.g., in memory, to thereby provide a generated vertex packet comprising the processed vertex attributes for the vertices of the vertex packet.

Once the appropriate vertex attribute processing (vertex shading) has been performed for the vertices of a vertex packet, a vertex packet comprising the appropriately processed attributes (e.g. transformed positions) for the vertices of the vertex packet will have been generated and stored, e.g., and in an embodiment in memory (and from where the appropriately processed vertex attributes (e.g. transformed positions) for the vertices of the vertex packet can then be retrieved and used by and for later stages of the graphics processing pipeline).

It would be possible at this stage to also still maintain the tracking information of the vertex indices (from the initially provided set of vertex indices for the output in question) of the vertices in the vertex packet. However, in an embodiment, at least in (and in an embodiment only in) the case where no further vertex shading is performed on the vertices, this is not done, and once the initially provided vertex indices have been used, for example, and in an embodiment, to trigger the appropriate processing (vertex shading) of the vertices in question (once a vertex packet has been "sent" for vertex attribute processing), the associated record of the vertex indices for the vertices allocated to that vertex packet can be, and is in an embodiment, discarded (cleared), i.e. such that thereafter a record of the (original) vertex indices of the vertices in the vertex packet is no longer maintained. In this case, the vertices are in an embodiment identified by reference to the vertex packet that they belong to and their identifier (e.g. index (position)) within that vertex packet.

This then has the effect that the vertices will be tracked individually in the vertex packets as the vertex packets are being assembled and before vertex attribute processing for the vertices of the vertex packets is triggered, but once vertex attribute processing for the vertices of a vertex packet has been triggered, the tracking of the individual vertices within the vertex packet is (in an embodiment) no longer performed.

The Applicants have recognised in this regard that once a vertex packet has been generated, it can be, and is, possible to track the use and processing of the vertices in that vertex packet for the packet as a whole, rather than still having to do that for individual vertices within the vertex packet. Accordingly, the individual vertex tracking information for a vertex packet can be, and is in an embodiment, discarded (and no longer used or performed) once a vertex packet has been "completed", and it is, e.g., and in an embodiment, no longer desired to consider whether there is any duplication of vertices in respect of the vertex packet.

As will be discussed in more detail below, this then reduces the "tracking" requirement for individual vertices after the initial primitive assembly and vertex packet generation process.

The assembled primitives and the generated vertex packets comprising the processed vertex attributes are provided to later stages of the graphics processing pipeline that is being executed by the graphics processor for processing. This may be done in any suitable and desired manner.

The assembled primitives that are provided to later stages of the graphics processing pipeline for processing could be provided to the later stages of the graphics processing pipeline in the form that they are assembled from the set of vertex indices provided for the output based on the primitive configuration information (and that is then used when generating the vertex packets) (and in an embodiment, this is what is done).

In this case therefore, each assembled primitive that is provided to the later stages of the graphics processing pipeline will comprise an identifier for the primitive and a set of one or more vertex indices for the primitive, which vertex indices are indices from (and in) the set of vertex indices (initially) provided for the output (and from which the primitives are initially assembled).

In an embodiment, the assembled primitives that are provided to later stages of the graphics processing after the vertex packets have been generated, rather than using (and being defined with reference to) vertex indices from the set of vertex indices (initially) provided for the output, are instead defined using and use vertex indices that index the vertices (and that reference the vertices) with respect to the generated vertex packets, and in particular within the individual vertex packets.

Thus, in an embodiment, a (and each) assembled primitive that is provided to later stages of the graphics processing pipeline comprises (in an embodiment in addition to an identifier for the primitive) a set of vertex indices for the primitive, but with each vertex index in the set of vertices indexing and indicating an index within (and with respect to) a generated vertex packet (rather than being a vertex index from the set of vertices (initially) provided for the output). In an embodiment, each vertex index for an assembled primitive that is provided to later stages of the graphics processing pipeline comprises an indication of (an identifier for) a vertex packet for the vertex (of the vertex packet that the vertex belongs to (is within)), and an identifier for (e.g. the position (index) of) that vertex within the vertex packet in question.

As discussed above, in an embodiment, the vertex packets generated for a render output are in an embodiment all allocated an identifier that (uniquely) identifies the packet within the set of generated vertex packets for the output. This vertex packet identifier may, for example, and in an embodiment, be an appropriate index for the vertex packets, and, for example, and in an embodiment, be generated by numbering the vertex packets in the sequence that they are generated.

Correspondingly, each vertex allocated to a vertex packet in an embodiment has a corresponding identifier that (uniquely) identifies the vertex within the vertex packet. Again, in an embodiment, the vertex identifier within a given vertex packet in an embodiment comprises an index for the vertex within the vertex packet, and in an embodiment the vertices are indexed within a vertex packet by numbering the vertices in sequence within the vertex packet. (Other arrangements would, of course, be possible.)

In this case therefore, and in an embodiment, an assembled primitive that is provided to later stages of the graphics processing pipeline (after the vertex packets have been generated) will comprise an identifier for the primitive and a set of one or more vertex indices for the primitive, where each vertex index for the primitive comprises a vertex packet identifier (index) and an identifier (index) for the vertex in the vertex packet in question.

Correspondingly, in an embodiment, once the assembled primitives have been generated from the set of vertex indices provided for the output based on their primitive configuration information, and those vertices have been added to vertex packets, the vertices for the assembled primitives are re-indexed based on the vertex packets that the vertices have been allocated to, with the new, vertex packet-based indices then being used as the vertex indices for the assembled primitives.

This re-indexing of the vertices for assembled primitives can be achieved in any suitable and desired manner. In an embodiment, when a vertex for an assembled primitive is allocated to a vertex packet, the "packet-based" index for that vertex is then associated with the assembled primitive to thereby become the vertex index for the vertex in question for (in) the assembled primitive. In this way, the appropriate packet-based vertex indices for assembled primitives can be, and are in an embodiment, generated as vertices are allocated to vertex packets.

Correspondingly, in an embodiment where it is checked whether the vertices of an assembled primitive are already present in a vertex packet or not, in the case where it is determined that a vertex for an assembled primitive is already present in a vertex packet (such that the vertex is not allocated again to a (the current) vertex packet), then in that case, the "packet-based" index for that vertex that is then associated with the assembled primitive will indicate the already existing instance of that vertex in a vertex packet (i.e. the vertex packet identifier (index) for the vertex packet where that vertex was determined to already be present, and an identifier (index) for the existing instance of the vertex in the vertex packet in question).

As will be discussed further below, providing the vertex indices for assembled primitives to later stages of the graphics processing pipeline using vertex packet-based indexing facilitates, inter alia, tracking the use of the vertex packets by later stages of the graphics processing pipeline, and in particular, and in an embodiment, identifying when all the vertices in a vertex packet have been appropriately processed by a later stage of the graphics processing pipeline, thereby reducing and/or avoiding the need to track the use of vertices by later stages of the graphics processing pipeline individually.

The assembled primitives can be provided to the later stages of the graphics processing pipeline in any suitable and desired manner. For example, the assembled primitives as they were assembled for the vertex packet generation process (with their vertex indices in an embodiment re-indexed as discussed above) could themselves be provided to the later stages of the graphics processing pipeline. In an embodiment, this is what is done.

In this case, in order to allow time for the vertex attribute processing for the vertices of the assembled primitives (in the generated vertex packets), and for that data to be appropriately fetched for use when processing the assembled primitives, there is in an embodiment some form of latency-hiding delay mechanism, such as, and in an embodiment, a queue (e.g. a FIFO) through which the assembled primitives are passed before they reach the next stage of the graphics processing pipeline for processing. This will then act to, in effect, hide any latency between the initial assembling of the primitives, the generating of the vertex packets, and the vertex attribute processing, before the assembled primitives fall to be processed by a later (e.g. the next) stage of the graphics processing pipeline.

Thus, in an embodiment, the providing the assembled primitives to later stages of the graphics processing pipeline comprises first passing the primitives through a latency-hiding buffer, such as a queue, such as a FIFO, before they are passed to a next stage of the graphics processing pipeline for processing.

In an embodiment, rather than using a latency hiding buffer, such as a queue, through which the assembled primitives (from the vertex packet generation process) are passed, the graphics processor and the graphics processing pipeline is operable to and configured to (and comprises appropriate processing circuitry configured to) "regenerate" the sequence of assembled primitives (that was used to generate the vertex packets) at a later time.

In this case therefore there will be an initial primitive assembly process that is used to assemble the sequence of primitives for the purposes of generating the vertex packets and triggering the vertex attribute processing for vertices in vertex packets (in the manner discussed above), but there will then be a second, later primitive assembly process that will repeat the earlier primitive assembly process to, in effect, re-generate the (same) sequence of assembled primitives, with that re-generated (second) sequence of assembled primitives then being sent to the later stages of the graphics processing pipeline (and thereby providing the assembled primitives that were used to generate the vertex packets) to the later stages of the graphics processing pipeline.

In this case, the later, second primitive assembly process (to re-generate the assembled primitives) can be, and in an embodiment is, initiated and triggered at a later time, for example, and in an embodiment, so as to allow for, and (try to) hide, any latency in the vertex attribute processing and the generation of the processed vertex attributes for the vertex packets (e.g. to (try to) synchronise the provision of the assembled primitives to the later stages of the graphics processing pipeline with the availability of the generated vertex packets).

It would be possible in this regard to, for example, wait until the vertex attribute processing has been triggered (and in an embodiment until the vertex attribute processing has been completed) for all the generated vertex packets for the output in question before performing the later, second primitive assembly process (to re-generate the assembled primitives) (and in an embodiment that is what is done).

Alternatively, the later, second primitive assembly process (to regenerate the assembled primitives) could be started before all of the assembled primitives and vertex packets have been generated by the "first" primitive assembly vertex packet generation process, but with there being some delay between assembling a primitive in the "first" primitive assembly process and the assembling of that primitive in the second, later primitive assembly process, so as to try to ensure that the primitive is only assembled again in the second primitive assembly process once the vertex attribute processing for the vertices of that primitive has been triggered (and in an embodiment has been completed) as part of the first primitive assembly process. Any suitable and desired arrangements may be used in this regard.

In these embodiments of the technology described herein, the initial assembling of the sequence of one or more assembled primitives to generate the vertex packets and trigger the vertex attribute processing for the vertices of the vertex packets could be considered to, in effect, and in an embodiment, be a "pre-fetch" operation that operates to trigger and perform "pre-fetching" (pre-preparation) of the processed vertex attributes (in the form of the vertex packets), with the desired "primitive assembly" for the render output then being performed at a later time (in an embodiment once the "pre-fetching" has been completed), to thereby assembly the primitives and trigger their processing using the "pre-fetched" processed vertex attributes.

Thus, in an embodiment, the method of the technology described herein comprises (and the graphics processor is correspondingly configured to), after performing a first primitive assembly process (and as part of that first primitive assembly process generating one or more vertex packets, as discussed above), thereafter performing a second primitive assembly process, comprising assembling a sequence of one or more primitives to be processed when generating the output from the set of vertex indices provided for the output based on the primitive configuration information provided for the output, each assembled primitive of the sequence of assembled primitives comprising an identifier for the primitive and a set of one or more vertex indices for the primitive, and providing the assembled primitives from the second primitive assembly process and the generated vertex packets comprising the processed vertex attributes generated from the first primitive assembly process to later stages of the graphics processing pipeline for processing.

The second primitive assembly process, where the assembling of the primitives is performed again (repeated) after the vertex packets have been generated and the vertex attribute processing for the vertices of the vertex packets has been triggered, can operate to assemble the primitives for provision to the later stages of the graphics processing pipeline in any suitable and desired manner.

This second, later primitive assembly operation should be such as to assemble the same sequence of primitives as were assembled for the purposes of generating the vertex packets, and should, and in an embodiment does, generate the assembled primitives in the appropriate form as is intended to be provided to the later stages of the graphics processing pipeline.

Thus, in the case where the assembled primitives use vertex indices from the set of vertex indices (initially) provided for the output, the later (second) primitive assembly process may, and in an embodiment does, simply comprise assembling (again) the sequence of one or more primitives to be processed when generating the output from the set of vertices provided for the output based on the primitive configuration information for the output (with each assembled primitive of the sequence of assembled primitives then comprising an identifier for the primitive and a set of one or more vertex indices (from the set of vertex indices provided for the output) for the primitive).

On the other hand, where it is desired to use a vertex packet-based indexing system for the vertices of the assembled primitives for their processing by later stages of the graphics processing pipeline (as discussed above), then the second primitive assembly process (to re-generate the sequence of assembled primitives) should be, and in an embodiment is, operable to and configured to generate the sequence of assembled primitives defined using the vertex packet-based indexing scheme.

Thus, in this case, the later (second) primitive assembly process should, and in an embodiment does, comprise assembling (again) the sequence of one or more primitives to be processed when generating the output from the set of vertices provided for the output based on the primitive configuration information for the output, with each assembled primitive of the sequence of assembled primitives comprising an identifier for the primitive and a set of one or more vertex packet-based vertex indices indicating the vertices to be used for the primitive (and in an embodiment with each vertex index for an assembled primitive comprising an indication of the vertex packet that the vertex belongs to (is within) and the identity (position (index)) of that vertex within the vertex packet in question).

In this case, the vertex packet-based indexed assembled primitives can be (re)-generated in the second, later primitive assembly process in any suitable and desired manner. In an embodiment this is done by the second, later primitive assembly process again being operable to generate appropriate vertex packets using the vertex indices for the assembled primitives (and accordingly to generate the same set of vertex packets as was generated by the first primitive assembly process for which the vertex attribute processing is then triggered), so as to thereby be able to determine the appropriate vertex packet-based indexing for the vertices of the assembled primitives.

However, in this case the second, later, primitive assembly process, although re-generating the vertex packets so as to determine which vertex packet or packets the indices of an assembled primitive will belong to (and the indexes/positions of the vertices within the vertex packet or packets in question) for indexing purposes, should not, and in an embodiment does not, trigger any vertex attribute processing for the vertices of a vertex packet (unlike in the first primitive assembly and vertex packet generation process).

In this case, the vertices of the assembled primitives are in an embodiment allocated to vertex packets, and the vertex packets are in an embodiment generated, in the same manner as for the first primitive assembly process (i.e. such that the same vertex packets, and accordingly the same sequence of assembled primitives using the vertex packet-based indexing scheme, are generated in the second, later primitive assembly process as were generated in the first primitive assembly process (that is used to trigger the vertex attribute processing for the vertices of the primitives)).

Thus, in an embodiment, the method of the technology described herein comprises (and the graphics processor is correspondingly configured to) (and includes processing circuits correspondingly configured to):

performing a first primitive assembly process to assemble a sequence of one or more of primitives to be processed when generating the output from the set of vertex indices provided for the output based on the primitive configuration information provided for the output;
   generating one or more vertex packets using the vertex indices for the assembled primitives, each vertex packet comprising a plurality of vertices of the assembled primitives;
   wherein the generating one or more vertex packets using the vertex indices for the assembled primitives comprises:

allocating vertices for assembled primitives to a vertex packet until a threshold number of vertices have been allocated to the vertex packet; and
   triggering vertex attribute processing for the vertices of the vertex packet, to thereby generate a vertex packet comprising processed vertex attributes for the vertices of the vertex packet;
and
thereafter:
performing a second primitive assembly process to assemble the (same) sequence of one or more of primitives to be processed when generating the output from the set of vertex indices provided for the output based on the primitive configuration information provided for the output;
generating one or more vertex packets using the vertex indices for the assembled primitives from the second primitive assembly process, each vertex packet comprising a plurality of vertices of the assembled primitives;
wherein the generating one or more vertex packets using the vertex indices for the assembled primitives from the second primitive assembly process comprises:
   allocating vertices for assembled primitives to a vertex packet until a threshold number of vertices have been allocated to the vertex packet;
and
providing the assembled primitives from the second primitive assembly process and the generated vertex packets comprising the processed vertex attributes to later stages of the graphics processing pipeline that is being executed by the graphics processor for processing.

As discussed above, in these embodiments of the technology described herein, the generation of the vertex packets using the vertex indices for the assembled primitives from the second vertex assembly process should not, and in an embodiment does not, comprise triggering or performing any vertex attribute processing for the vertices of the vertex packets. Rather, and in an embodiment, the vertex packets that are generated following the second primitive assembly process are in an embodiment simply used so as to allow the second primitive assembly process to output assembled primitives that use a vertex packet-based indexing scheme for the assembled primitives.

Thus, in these embodiments of the technology described herein, the method in an embodiment comprises (and the graphics processor is correspondingly configured to, and include processing circuit(s) correspondingly configured to) using the vertex packets generated using the assembled primitives from the second primitive assembly process to generate vertex packet-based indexes for the primitives assembled by the second primitive assembly process, whereby the second primitive assembly process provides a sequence of one or more assembled primitives to be processed, with each assembled primitive of the sequence of assembled primitives from the second primitive assembly process comprising an identifier for the primitive and a set of one or more vertex packet-based vertex indices for the primitive.

The processed vertex attributes for the vertices of a (and the) vertex packets (once they have been generated and appropriately stored) can be provided to later stages of the graphics processing pipeline in any suitable and desired manner. In an embodiment, the processed vertex attributes are fetched from where they are stored (e.g. in (main)

memory) for use as part of the graphics processing that is being performed by the graphics processor (and on and for the assembled primitives).

In an embodiment, the processed vertex attributes are fetched into local (intermediate) storage, such as, and in an embodiment, a buffer (a "vertex buffer") that is configured to store the processed vertex attributes, for use.

Thus, in an embodiment, the graphics processor includes a buffer (a vertex buffer) that stores fetched processed vertex attributes (and the processed vertex attributes are used from that buffer for performing processing using the processed vertex attributes).

Correspondingly, in an embodiment, the graphics processor includes an appropriate processed vertex attribute fetcher (fetching circuit) that is operable to, and configured to, fetch processed vertex attributes of vertex packets for use, and in an embodiment into an appropriate local (intermediate) storage, such as, and in an embodiment, a vertex buffer (as discussed above).

In an embodiment, processed vertex attributes can be evicted from the, e.g., vertex buffer, e.g., and in an embodiment, so as to free up space in the e.g. vertex buffer for new processed vertex attributes.

The processed vertex attributes that are fetched for the vertices (into the vertex buffer) should be, and are in an embodiment, those vertex attributes that have been processed for and when generating the vertex packets, and thus in an embodiment comprise only some, but not all, e.g. one, of the attributes for the vertices, and in an embodiment (only) position attributes (the positions) for the vertices.

The processed vertex attributes for the vertices in the generated vertex packets can be fetched, e.g. into the vertex buffer, in any suitable and desired manner. For example, they could be fetched for individual vertices, as and when those individual vertices are to be used for assembled primitives.

In an embodiment, the processed vertex attributes for the generated vertex packets are fetched into the vertex buffer for use on a vertex packet-by-vertex packet basis. Thus, in an embodiment, a vertex packet comprising processed vertex attributes for the vertices of the vertex packet is fetched (e.g. into the vertex buffer) as a whole, i.e. such that the processed vertex attributes for all the vertices of a vertex packet will be fetched (into the vertex buffer) for use together (at the same time) (rather than, for example, fetching processed vertex attributes for only some but not all of the vertices of a vertex packet at any given time).

Correspondingly, in an embodiment, the fetching of the processed vertex attributes for vertices of the vertex packets comprises fetching entire generated vertex packets into the vertex buffer, and the vertex buffer is configured and operated to store (and in an embodiment only store) "integer" vertex packets (i.e. does not store only some but not all (part of) a vertex packet).

Correspondingly, when processed vertex attributes are to be evicted from the vertex buffer, in an embodiment an entire vertex packet is evicted from the vertex buffer rather than, for example, evicting only some but not all of the processed vertex attributes for the vertices of a vertex packet.

Thus, in an embodiment, the processed vertex attributes fetcher (fetching circuit) is configured to and operable to control the fetching of (whole) vertex packets into the, e.g., vertex buffer (and the evicting of (whole) vertex packets from the, e.g. vertex buffer).

The intermediate storage, e.g. vertex buffer, could be configured to store only a single vertex packet (the processed vertex attributes for the vertices of a single vertex packet), but in an embodiment can store (the processed vertex attributes for) a plurality of vertex packets, such as and in an embodiment up to a particular, in an embodiment selected, in an embodiment predetermined, plural number of vertex packets. For example, the vertex buffer could be configured to store up to four or six vertex packets (the processed vertex attributes for up to four or six vertex packets) at any given time.

Storing more than one complete vertex packet in the, e.g. vertex buffer at the same time will help to facilitate the appropriate processed vertex attributes being available for assembled primitives as they require their processed vertex attributes rather than, for example, assembled primitives having to wait while their corresponding processed vertex attributes are loaded into the vertex buffer.

In an embodiment, the fetching of processed vertex attributes for vertex packets into the vertex buffer is controlled, inter alia, in accordance with, and based on, the completion of the generation of the processed vertex attributes for vertices of the vertex packets. Thus, when the processing of the vertex attributes for the vertices of a vertex packet is completed (such that a completed vertex packet is stored in the memory), that is in an embodiment signalled appropriately, so that the vertex packet can then be loaded into the vertex buffer as appropriate. For example, and in an embodiment, the completion of the generation of a vertex packet could be signalled to an appropriate vertex packet fetcher (fetching circuit), which will then be operable to load the completed vertex packet into the vertex buffer (at the appropriate time).

Correspondingly, vertex packets are in an embodiment loaded into the vertex buffer as they become ready (and up to the capacity of the vertex buffer). Thus, the vertex packets are in an embodiment loaded into the vertex buffer in turn, in an embodiment in the order (sequence) in which they are generated (as the primitives are assembled). This will then mean that the loading of the vertex packets into the vertex buffer will follow the sequence of the assembled primitives, such that the relevant vertex packets should be present in the vertex buffer in the appropriate order for the sequence of assembled primitives to be processed.

The loading of the vertex packets into the vertex buffer as they become ready is in an embodiment configured such that a vertex packet containing the relevant processed vertex attributes will be present in the vertex buffer when the corresponding assembled primitives that are to use vertices of the vertex packet fall to be processed using the vertices from the vertex packet (i.e. will need the processed vertex attributes from the vertex buffer). As discussed above, there are in an embodiment appropriate latency hiding mechanisms used to delay the sending of the assembled primitives to the late primitive assembly process until the relevant vertex packets have been prepared and fetched into the vertex buffer.

Correspondingly, when an assembled primitive falls to be processed and requires processed vertex attributes from the vertex buffer, the corresponding vertex packet(s) containing the processed vertex attributes for the vertices of the primitive in question is in an embodiment determined (e.g., and in an embodiment, from vertex-packet-based indexing of the primitives vertices) to determine which vertex packet(s) the processed vertex attributes for the primitive are stored in (in the vertex buffer). (In the case where a required vertex packet is not already present in the vertex buffer, then the processing of the primitive in question should be, and is in an embodiment, appropriately stalled, until the relevant vertex packet has been fetched into the vertex buffer.)

Correspondingly, vertex packets are in an embodiment evicted from the vertex buffer in turn, in an embodiment in the order (sequence) in which they are fetched into the vertex buffer.

Thus the vertex packets are in an embodiment loaded into, used, and then evicted from the, e.g. vertex buffer, in a first-in, first-out order.

The vertex packet evicting operation (from the e.g. vertex buffer) is in an embodiment configured such that a vertex packet should only be (and will only be) evicted from the vertex buffer (e.g. so that it can be replaced by another vertex packet) once (it has been determined that) the vertices in the vertex packet in the vertex buffer will no longer be required for the desired processing of assembled primitives.

The eviction of vertex packets from the, e.g. vertex buffer can be controlled such that a vertex packet should only be evicted from the vertex buffer once the vertices in the vertex packet will no longer be required from the vertex buffer for processing of assembled primitives in any suitable and desired manner.

In an embodiment, the use of vertex packets for assembled primitives is tracked, and once it is determined from that tracking that processed vertices in a vertex packet will no longer be required from the, e.g. vertex buffer for (any) assembled primitives, the vertex packet is allowed to be evicted from the vertex buffer (but the vertex packet is not permitted) (is other than permitted) to be evicted from the vertex buffer unless and until the tracking of the use of the vertices in the vertex packet determines that the vertex packet can be (safely) evicted from the vertex buffer).

The use of vertex packets from the vertex buffer for assembled primitives can be tracked in any suitable and desired manner. For example, and in an embodiment, the last primitive that uses a vertex packet could be appropriately indicated in the sequence of assembled primitives (e.g. by using an appropriate flag).

In an embodiment, the tracking of the use of the vertex packets (to facilitate their eviction from the vertex buffer) comprises (at least) tracking and determining when no more assembled primitives will use the vertices included in a particular vertex packet (i.e. that all the primitives using vertices in the vertex packet have been assembled).

In the case where vertices are simply added to vertex packets in turn until a vertex packet is full, or it is only attempted to avoid duplication of a vertices within the same vertex packet, this can be, and is in an embodiment, determined based on identifying when a new vertex packet is started for vertices of assembled primitives (since when a new vertex packet is started, it can be assumed that all the assembled primitives that will use the previous, now finished vertex packet, have been assembled).

In the case where, as discussed above, an, e.g. queue, of plural vertex packets is maintained as the vertex packets are being generated, so as to try to avoid duplication of vertices within and across a plurality of vertex packets, then in an embodiment it is tracked and identified when a vertex packet is no longer being checked to avoid duplication of vertices for assembled primitives in the vertex packets ("leaves" the duplication checking queue), as again at that point it can be assumed that no later assembled primitives will use vertices from the vertex packet in question (that all the assembled primitives that will use the vertex packet in question have been assembled).

Once it has been determined that all the assembled primitives that will use a vertex packet have been assembled (and included in the sequence of assembled primitives), that is in an embodiment indicated (signalled) to a later stage of the graphics processing pipeline that is being executed by the graphics processor of the graphics processing pipeline that is or that is after the last stage of the graphics processing pipeline that will use the vertex attributes in vertex packets from the, e.g. vertex buffer, so that that later stage can identify when all the assembled primitives that will use a particular vertex packet have been processed up to, and/or up to including, that later stage of the graphics processing pipeline. This will then allow the later stage of the graphics processing pipeline to identify when all the assembled primitives that use a given vertex packet have been processed up to (and/or by) that later stage of the graphics processing pipeline, such that, for example, and in an embodiment, it can then be determined that the vertex packet in question is no longer required in the vertex buffer (and so can safely be evicted from the vertex buffer).

The signal that all the assembled primitives that will use a vertex packet have been assembled can be provided to a later stage of the graphics processing pipeline in any suitable and desired manner. In an embodiment, an appropriate signal (indication) (e.g. a vertex packet "retire" indication) is associated with (e.g. included in) the sequence of assembled primitives (for example, being a flag set in the last primitive using the packet or an indication provided after (and in an embodiment immediately after the last assembled primitive that will use the vertex packet in question), such that when that vertex packet "retire" indication is seen in relation to the sequence of assembled primitives, it can then be known that no more assembled primitives in the sequence of assembled primitives will use the vertex packet in question from the vertex buffer (and therefore the vertex packet in question can be safely evicted from the vertex buffer).

When it sees (receives) the vertex packet "retire" signal for a vertex packet, the later stage of the graphics processing pipeline in an embodiment then sends an appropriate vertex packet "evict" signal, for example, and in an embodiment, to the vertex packet fetching process (fetching circuit) that controls the fetching of vertex packets into and the eviction of vertex packets from the, e.g. vertex buffer, to indicate that the vertex packet in question can (safely) be evicted from the, e.g. vertex buffer (as it can assumed that that at that point no further assembled primitives will need the vertex packet in question from the vertex buffer).

This vertex packet "retire" signal is in an embodiment provided by, and as part of the primitive assembly process, so in the case where there is only a single "early" primitive assembly process, by that process, or in the case where the "early" primitive assembly process is repeated to regenerate the sequence of assembled primitives (as discussed above), by the second instance of the "early" primitive assembly process that operates to regenerate the sequence of assembled primitives for processing.

Thus, in an embodiment, the primitive assembly process tracks the use of the vertex packets for assembled primitives, and provides an indication with the sequence of assembled primitives of when no more (no further) assembled primitives in the sequence will use vertices included in a particular vertex packet (i.e. that all the primitives using vertices in the vertex packet have been assembled and included in the sequence of assembled primitives).

The vertex packet "retire" signal should, and in an embodiment does, identify appropriately the vertex packet in question, e.g., and in an embodiment, by using the appropriate identifier for the vertex packet.

In response to the "vertex packet eviction" signal from the later stage of the graphics processing pipeline, the vertex packet could be immediately evicted from the vertex buffer, or it could simply be noted as being able to be evicted, and then evicted when and if space for a new vertex packet is required. For example, the vertex packet fetching and eviction process (circuit) may, and in an embodiment does, maintain a record of those vertex packets that can be evicted, so as to be able to evict a vertex packet as and when required.

The processed vertex attributes of the generated vertex packets should be, and are in an embodiment, used from the, e.g., vertex buffer for at least some processing of assembled primitives, but once the use of those attributes from the vertex buffer for that processing has been completed, then the relevant vertex attributes will no longer be required from the vertex buffer. Thus, in an embodiment, the sending of a vertex packet "evict" signals is performed at an appropriate point after, and in an embodiment at, the point in the graphics processing sequence (pipeline) where the processed vertex attributes from the vertex buffer have been used for assembled primitives (and will no longer be required from the vertex buffer for assembled primitives).

Thus, the vertex packet evict signal should be, and is in an embodiment, only sent when and once a vertex packet will no longer be required for use from the vertex buffer for assembled primitives. Thus it is in an embodiment sent from a graphics processing stage after which the processed vertex attributes in a vertex packet will no longer be required from the vertex buffer for any assembled primitives. (Correspondingly, the vertex packet "retire" signal is in an embodiment sent through the graphics processing pipeline up to and including the graphics processing stage (the point) after which the processed vertex attributes in a vertex packet will no longer be required from the vertex buffer for any assembled primitives, so that that processing stage can then see the vertex packet "retire" signal and in response thereto send an appropriate vertex packet "evict" signal.)

This may be done at any suitable and desired stage in the processing of the assembled primitives.

For example, there may be a stage in the processing of the assembled primitives that uses the processed vertex attributes from the vertex buffer, e.g. where the processed vertex attributes are associated with the assembled primitives themselves. A vertex packet in an embodiment is not (able to be) evicted from the vertex buffer at least until all the assembled primitives that use the vertex packet have passed this stage in the processing of the assembled primitives, e.g. a stage in the processing of the assembled primitives where the processed vertex attributes are associated with the assembled primitives themselves.

In an embodiment the vertex packet "evict" signals are sent at a point in the processing of the assembled primitives after it is determined whether assembled primitives are visible (or not) (and so should be processed further or not).

For example, in the case of tile-based graphics processing, there may be, and typically will be, some form of culling, e.g. visibility, check for assembled primitives to determine that an assembled primitive should actually be added to and included in a primitive list (or otherwise culled and not included in a primitive list). This culling may be, and is in an embodiment, based on the potential visibility of primitives and so may comprise one or more or all of: front/back-face culling, frustum culling, sample aware culling, etc.

In an embodiment, where the graphics processor performs tile-based processing and includes such a (visibility) culling process as part of the tiling process, the sending of the vertex packet evict signals, to evict a vertex packet from the, e.g., vertex buffer is performed after that culling determination stage (and in an embodiment immediately after that culling determination stage), such that once all the assembled primitives that use a given vertex packet have been subjected to the culling determination, the vertex packet "evict" signal is sent.

The eviction of vertex packets from the vertex buffer using the tracking of the use of the vertex packets from the vertex buffer can be performed in any suitable and desired manner. In an embodiment there is, as discussed above, an appropriate vertex packet fetcher (fetching circuit) that is operable to and configured to load vertex packets into the vertex buffer and to evict vertex packets from the vertex buffer, and the vertex packet use tracking sends appropriate vertex packet "evict" signals to the vertex packet fetcher as and when it is determined (in response to it being determined) that a vertex packet is no longer required from the vertex buffer, such that the vertex packet fetcher can then evict the vertex packet from the vertex buffer when required.

Other arrangements would, of course, be possible.

Loading and evicting vertex packets into and from the, e.g. vertex buffer as a whole, and tracking the use of processed vertex attributes for assembled primitives on a vertex packet-by-vertex packet basis, means that only the use and lifetimes of the vertex packets as a whole needs to be tracked and managed (rather than having to, for example, track and manage the lifetimes and use of individual vertices in the vertex buffer). This then can significantly reduce and simplify the tracking and management of processed vertices for assembled primitives and the use of processed vertex attribute data for the vertices of assembled primitives.

In an embodiment the vertex packets stored in the, e.g. vertex buffer are appropriately tracked, for example, and in an embodiment, so as to keep track of one or more of, and in an embodiment all of: the oldest vertex packet in the buffer (which will in an embodiment then be the next packet to be evicted), the "current" vertex packet in the buffer (the vertex packet the vertices of which are currently being used by assembled primitives), and the vertex packet to be used next. This tracking of the vertex packets in the vertex buffer can be achieved in any suitable and desired manner, such as by maintaining appropriate pointers to the positions in the buffer of the different vertex packets.

Once a (the) vertex packets comprising the processed vertex attributes for assembled primitives have been fetched into the, e.g. vertex buffer, then the assembled primitives can be and are in an embodiment, processed, using, inter alia, the fetched processed vertex packets from the vertex buffer. This processing can be any suitable and desired processing of the assembled primitives.

In an embodiment, the graphics processor further comprises, (logically) after the vertex packet fetching stage (circuit), a "late" primitive assembly process (stage) (and circuit) that is operable to and configured to output a sequence of one or more assembled primitives to be processed (corresponding to the sequence of assembled primitives provided to the vertex packet fetching stage (circuit)), with, in this case (and at this stage), each assembled primitive of the sequence of assembled primitives comprising (at least) an identifier for the primitive and a set of one or more processed vertex attributes for (and corresponding to) each vertex for the assembled primitive.

This late primitive assembly stage (circuit) is thus in an embodiment operable and configured to associate fetched processed vertex attributes (and any other fetched data) from the vertex buffer with the relevant assembled primitives, and to output a sequence of assembled primitives that include the appropriate fetched processed vertex attributes, to later stages of the graphics processing pipeline for execution.

Thus in an embodiment, the method of the technology described herein includes (and the graphics processor correspondingly comprises) both an "early" primitive assembly stage (circuit) operable to assemble primitives from vertex indices based on the primitive configuration information (as discussed above), which is then followed by a "late" primitive assembly stage (circuit) after the processed vertex attribute (vertex packet) fetching, which late primitive assembly process (circuit) outputs a sequence of assembled primitives to be processed, with each assembled primitive of that stage comprising an identifier for the primitive and a set of one or more processed vertex attributes for (and corresponding to) each vertex for the assembled primitive (based on the indicated vertex indices for the assembled primitive output from the early primitive assembly stage (circuit)).

The "late" primitive assembly process (circuit) accordingly in an embodiment receives (and/or fetches) as input the (sequence of) assembled primitives from the initial (early) primitive assembly stage (circuit) and the processed vertex attributes (and any other fetched data) from the vertex packets (in the vertex buffer), and outputs based on and using those inputs, a (corresponding) sequence of assembled primitives including, for each primitive, one or more processed vertex attributes for the vertices for the primitive in question. The late primitive assembly process (circuit) should, and in an embodiment does, output the same sequence of assembled primitives (and in the same primitive (sequence) order) as the sequence of assembled primitives that is output by the initial (early) primitive assembly process (circuit).

The late primitive assembly process (circuit) will output for each primitive the corresponding processed vertex attribute or attributes (and any other data) for that primitive based on the vertex indices for the primitive. Thus, in an embodiment discussed above where the vertex attribute that is processed is a position for each index (vertex), the late primitive assembly process (circuit) will output for each assembled primitive, an appropriate set of (in an embodiment appropriately transformed) positions for the primitive, i.e. the (transformed) position for each index (vertex) of the primitive in question.

The late primitive assembly stage (circuit) in an embodiment determines the vertices (the vertex attributes) to use for assembled primitives on the basis of the indices for the assembled primitives received from the early primitive assembly stage (circuit). Thus, in an embodiment when the assembled primitives from the early primitive assembly stage (circuit) have their vertices indicated using a vertex packet-based indexing scheme, the late primitive assembly stage (circuit) will identify from the vertex indices for an assembled primitive, the vertex packet and the position/index within the vertex packet of the processed attributes for the vertex in question.

It will accordingly be appreciated that in embodiments of the technology described herein at least, when an assembled primitive is received by the late primitive assembly stage (circuit), the indicated vertices for the primitive in question will be looked up in the vertex buffer to retrieve the corresponding processed vertex attributes for those vertices. In the case where the processed vertex attributes for the vertices of the assembled primitive are stored in the vertex buffer, then they can simply be retrieved therefrom.

On the other hand, when it is determined that a vertex for a primitive is not currently stored in the vertex buffer, then the processing of the primitive in question should be stalled until its processed vertex attributes are available in the, e.g. vertex buffer. (As discussed above, the expectation is that in embodiments of the technology described herein at least, in particular where plural vertex packets may be stored in the vertex buffer, the processed vertex attributes for assembled primitives should and would normally be available in the vertex buffer as and when they are required.)

In order to facilitate this operation, it is in an embodiment kept track of the vertices that are (currently stored) in the vertex buffer. This can be done in any suitable and desired manner, for example, and in an embodiment, by maintaining and storing information indicative of which vertices are currently stored by the vertex buffer. In an embodiment, it is tracked which vertex packets are currently stored in the vertex buffer (rather than tracking which individual vertices are stored in the vertex buffer).

For example, in the case where the vertices for assembled primitives are indicated using vertex-packet-based indexing, which vertex packets are currently stored in the vertex buffer could be tracked by maintaining and storing information indicating which vertex packet indexes relate to vertex packets that currently stored in the vertex buffer. Such vertex packet tracking information could take any suitable and desired form. For example, a (vertex packet) bitmap that includes respective entries for each vertex packet (index) could be used to indicate and track whether a given vertex packet is currently stored in the vertex buffer or not.

Alternatively, it may not be necessary to keep track of which particular vertex packets are currently stored in the vertex buffer on the basis of the vertex packet indexes. This may be the case in embodiments (such as those described above) where packets are loaded into the vertex buffer on a first-in-first-out (FIFO) basis, wherein eviction of a packet from the vertex buffer allows a next packet (which has been generated and for which vertex processing has been performed) to be allocated and loaded into the buffer (such that packets will be loaded into and evicted from the vertex buffer according to the (known) order in which the packets are generated). Thus, in embodiments, it is tracked whether vertex packets (which have been generated and for which vertex processing has been performed) have (yet) been stored (fetched to) in the vertex buffer (but it is not tracked which particular vertex packets are currently stored in the vertex buffer). Once the assembled primitives including the relevant fetched (and shaded) vertex attributes (e.g. and in an embodiment the shaded vertex positions) have been assembled (by the late primitive assembly stage (circuit)), the so-assembled primitives, including their fetched vertex attributes, are (in an embodiment) then provided to later stages of the graphics processing pipeline that the graphics processor executes for processing.

Thus, the assembled primitives including their fetched vertex attributes are passed onwards for the appropriate further processing in order to process those primitives when generating the output.

The processing of the (assembled) primitives can comprise any suitable and desired primitive processing that may be performed when generating an output.

The processing of the primitives in an embodiment comprises at least rendering the primitives to generate, e.g., and in an embodiment, rendered output data for the primitives. The rendering may be performed by, e.g., rasterising the primitives to fragments and then rendering (fragment shading) the so-generated fragments. Additionally or alternatively, the primitives may be rendered using ray-tracing or hybrid ray-tracing techniques.

Correspondingly, the graphics processor in one embodiment further comprises a rasteriser (rasterisation circuit) and a renderer (rendering circuit) (in an embodiment in the form of a programmable fragment shader).

The processing of the assembled primitives, such as the rasterisation and rendering of the assembled primitives, can be performed in any desired and suitable manner, e.g., and in an embodiment, depending upon and in accordance with the graphics processor and graphics processing pipeline in question. In general, and in an embodiment, the assembled primitives are rasterised and/or rendered, etc., as would normally be done for the graphics processor and graphics processing pipeline in question (as once the primitives are assembled in the manner of the technology described herein, the primitives are no different to primitives that would have been assembled in any other manner).

The assembled primitives, including the processed vertex attributes, should be, and are in an embodiment, passed to the next stage (circuit) of the graphics processing pipeline that is being executed by the graphics processor. This may be any suitable and desired stage of a graphics processing pipeline that (e.g. immediately) follows the completion of the primitive assembly stage. For example, in the case of an immediate mode renderer, the assembled, complete primitives may be passed to the, e.g. rasteriser, for processing.

In the case where the graphics processor is a tile-based graphics processor, the assembled primitives with their vertex attributes are in an embodiment passed to the tiler (tiling stage) of the graphics processor and graphics processing pipeline for "tiling".

Thus, in an embodiment, the graphics processor is a tile based graphics processor (and the graphics processing pipeline that the graphics processor executes correspondingly performs tile based graphics processing), and the assembled, complete primitives including their associated fetched (and processed) vertex data (attributes) are first provided to the tiling process (a tiler circuit) of the graphics processor and graphics processing pipeline, for the generation of appropriate primitive lists, before the respective primitives are then further processed (e.g. rasterised and rendered).

The tiling process and operation in these embodiments of the technology described herein can be performed in any suitable and desired manner, such as, and in an embodiment, in accordance with the normal manner for the graphics processor and graphics processing pipeline in question.

Thus the tiling process should, and in an embodiment does, include a determination of which region or regions of a plurality of regions that the render output has been divided into for the tiling process, a respective primitive falls within, and then adding the primitive to a respective primitive list or lists for the region or regions in question. This process may, for example, and in an embodiment, comprise determining a bounding box representative of the position of the primitive within the output, and then comparing the position of that bounding box to the respective regions for which primitive lists can be prepared, to determine which primitive list or lists the primitive should be included (listed) in.

In an embodiment, the tiling process comprises a primitive culling process, e.g., and in an embodiment, to cull primitives based on their potential visibility (as discussed above).

The output of the culling and bounding box generation process (of the tiling process) is in an embodiment correspondingly a set of primitives, together with their corresponding bounding boxes. This in an embodiment comprises an identifier for the primitive, a set of vertex indices for the primitive, and an indication of the bounding box (bounding box information) for the primitive (in an embodiment in terms of which (at the resolution of the) primitive list regions (e.g. rendering tiles) the primitive falls within).

The bounding boxes from the bounding box generation, etc., process, are then in an embodiment used to determine which primitive lists the corresponding primitives should be included in (written to). This is in an embodiment done by an appropriate binning stage (circuit) of the graphics processor and graphics processing pipeline, which outputs a sequence of primitives, together with for each primitive, an indication of the primitive list that the primitive should be included in.

Once it has been determined which primitive list or lists a given primitive (whether a combined primitive or an individual primitive) should be included in, then the primitive is in an embodiment appropriately written into the appropriate primitive list or lists, e.g. in memory. This process may, and in an embodiment does, include appropriately compressing the primitive lists, e.g. as they are being written.

The remaining processing of the primitives can then proceed in any suitable and desired manner. For example, there may be a primitive list reader that reads the primitive lists to determine the primitives to be processed for a rendering tile, and then provides those primitives for processing, e.g. to a further vertex attribute fetching stage/circuit that is configured to fetch vertex attributes for assembled primitives that will be needed for the rasterisation and rendering processes, that is then followed by a primitive (triangle) setup stage/circuit.

Following the primitive (triangle) setup stage, the sequence of assembled primitives may then be sent onwards for rasterisation and rendering (or for rendering in the case of a non-rasterisation-based renderer).

The rasterisation (if any) and rendering processes can be performed in any suitable and desired manner, and are in an embodiment done in accordance with the normal rasterising and rendering processes for the graphics processor and graphics processing pipeline in question.

Once the primitives have been (rasterised and) rendered, the output of that processing can then, e.g., and in an embodiment, be written, e.g. to, e.g., a frame buffer in, e.g. main memory, from where it can then, e.g., be provided to a display for display, or otherwise processed. This is in an embodiment done via a tile buffer in the case of tile based rendering.

As discussed above, in embodiments, the vertex attribute processing that is performed for vertex packets at the (early) primitive assembly process triggers the processing of only some but not all of the attributes for each vertex. In this case therefore, other attributes for the vertices of the primitives may be, where necessary, processed (vertex shaded)) during and for subsequent processing of the primitives, at a later point in the graphics processing sequence, e.g. at an appropriate later stage or stages of the graphics processing pipeline where the vertex attributes in question are required.

In this case therefore, there will be further processing (vertex shading) of other vertex attributes for the assembled primitives, in addition to the vertex attribute processing that takes place when assembling the vertex packets.

Thus, in an embodiment, the method of the technology described herein further comprises (and the graphics processor includes a processing circuit or circuits operable and configured to) processing (vertex shading)) other attributes for the vertices of the assembled primitives, after the vertex attribute processing that is triggered by the generation of the vertex packets.

This further processing (vertex shading) of other vertex attributes (varyings) for the assembled primitives can be performed at any suitable and desired later stage or stages of the graphics processing pipeline. In the case of tile-based graphics processing, this is in an embodiment triggered and performed at the point where an assembled primitive passes the culling test (as discussed above) that is performed as part of the tiling process, i.e. such that once it is determined that a primitive will be included in a primitive list, any required further processing (vertex shading) of other vertex attributes (varyings) for the assembled primitive is triggered.

Correspondingly, in the case where further processing (vertex shading) of other vertex attributes is performed for an assembled primitive, those further processed vertex attributes for the vertices of the assembled primitive are in an embodiment appropriately included in a vertex packet, such that at that point the vertex packets will store for the vertices that they relate to, both appropriately processed (vertex shaded) positions, and appropriately processed (vertex shaded) one or more other vertex attributes for the vertices in question.

The above describes the main elements of the graphics processor and graphics processing pipeline that are involved in the operation in the manner of the technology described herein. As will be appreciated by those skilled in the art, the graphics processor can otherwise include and execute, and in an embodiment does include and execute, any one or one or more, and in an embodiment all, of the other processing stages and circuits that graphics processors and graphics processing pipelines may (normally) include. Thus, for example, the graphics processor may also include a primitive setup circuit, a rasteriser circuit and a renderer circuit (in an embodiment in the form of or including a programmable fragment shader), a depth (or depth and stencil) tester, a blender, a tile buffer, a write out circuit, etc.

In an embodiment, the graphics processor comprises, and/or is in communication with, one or more memories and/or memory devices that store the data described herein, and/or that store software for performing the processes described herein. The graphics processor may also be in communication with a host microprocessor, and/or with a display for displaying images based on the output of the graphics processor.

The output to be generated may comprise any useful output that can and is to be generated by the graphics processor and processing pipeline. Thus it may comprise, for example, a tile to be generated in a tile based graphics processing system, and/or a frame of output fragment data. The technology described herein can be used for all forms of output that a graphics processor and processing pipeline may be used to generate, such as frames for display, render-to-texture outputs, etc. In an embodiment, the output is an output frame, and in an embodiment an image.

In an embodiment, the various functions of the technology described herein are carried out on a single graphics processing platform that generates and outputs the (rendered) data that is, e.g., written to a frame buffer for a display device.

The various functions of the technology described herein can be carried out in any desired and suitable manner. For example, unless otherwise indicated, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are configured to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry/circuits, etc., if desired.

Furthermore, unless otherwise indicated, any one or more or all of the processing stages of the technology described herein may be embodied as processing stage circuits, e.g., in the form of one or more fixed-function units (hardware) (processing circuits), and/or in the form of programmable processing circuits that can be programmed to perform the desired operation. Equally, any one or more of the processing stages and processing stage circuitry of the technology described herein may be provided as a separate circuit element to any one or more of the other processing stages or processing stage circuits, and/or any one or more or all of the processing stages and processing stage circuits may be at least partially formed of shared processing circuits.

Subject to any hardware necessary to carry out the specific functions discussed above, the graphics processor can otherwise include any one or more or all of the usual functional units, etc., that graphics processors include.

It will also be appreciated by those skilled in the art that all of the described embodiments of the technology described herein can, and, in an embodiment, do, include, as appropriate, any one or more or all of the features described herein.

The methods in accordance with the technology described herein may be implemented at least partially using software e.g. computer programs. It will thus be seen that the technology described herein may provide computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical (non-transitory) storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus, in a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CDROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrinkwrapped software, preloaded with a computer system, for example, on a system ROM or fixed disk, or distributed from a server or electronic bulletin board over a network, for example, the Internet or World Wide Web.

Figure 2:
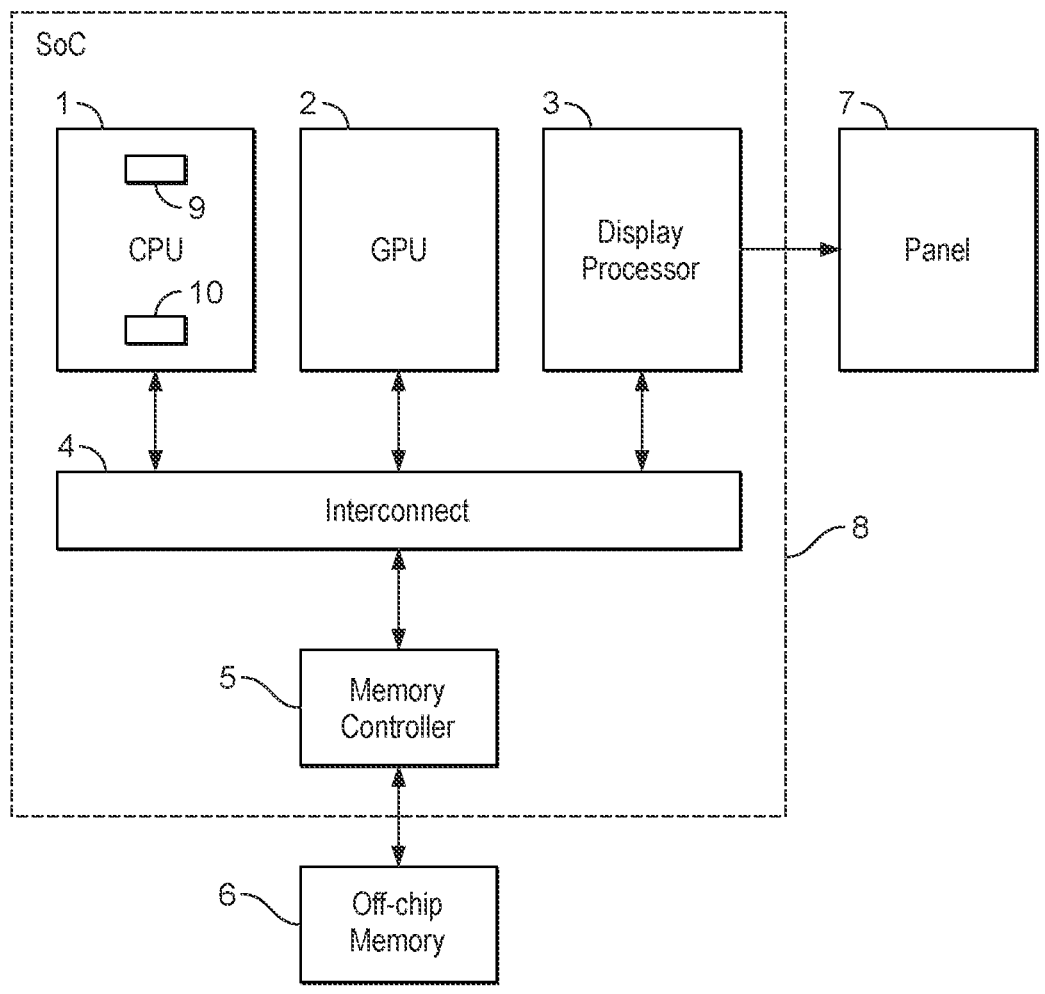
FIG. 2 shows an exemplary data processing system in which the technology described herein may be implemented.

FIG. 2 shows an exemplary system on chip (SoC) graphics processing system 8 that comprises a host processor comprising a central processing unit (CPU) 1, a graphics processor (GPU) 2, a display processor 3, and a memory controller 5. The exemplary data processing system may also comprise a video engine (not shown in FIG. 2). As shown in FIG. 2, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 9 such as a game, executing on one or more host processors (CPUs) 1 will, for example, require the display of frames on the display panel 7. To do this, the application will submit appropriate commands and data to a driver 10 for the graphics processor 2, e.g. that is executing on a CPU 1. The driver 10 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display In the present embodiment, the graphics processor 2 executes a graphics processing pipeline that processes graphics primitives, such as triangles, when generating an output, such as an image for display. The graphics processing pipeline includes and performs similar operations to those illustrated in the graphics processing sequence shown in FIG. 1, but in the present embodiments, and as will be discussed further below, the primitive assembly process also generates "vertex packets" comprising vertices of assembled primitives in the manner of the technology described herein.

Figure 3:
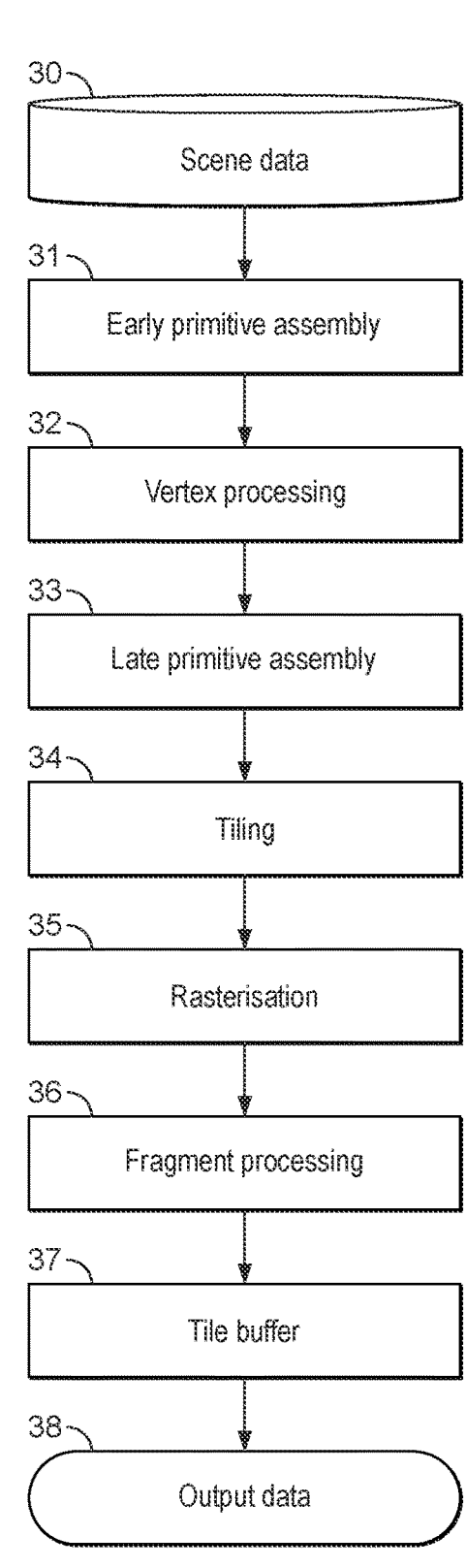
FIG. 3 shows schematically a graphics processor that may be operated in accordance with the technology described herein.

FIG. 3 shows schematically the graphics processor 2 and the processing sequence of the graphics processing pipeline executed by the graphics processor 2 when generating an output in the present embodiments.

FIG. 3 shows the main elements and pipeline stages/circuits. As will be appreciated by those skilled in the art there may be other elements of the graphics processor and processing pipeline that are not illustrated in FIG. 3. It should also be noted here that FIG. 3 is only schematic, and that, for example, in practice the shown functional units and pipeline stages may share significant hardware circuits, even though they are shown schematically as separate stages in FIG. 3. It will also be appreciated that each of the stages, elements and units, etc., of the graphics processor and processing pipeline as shown in FIG. 3 may, unless otherwise indicated, be implemented as desired and will accordingly comprise, e.g., appropriate circuitry, circuits and/or processing logic, etc., for performing the necessary operation and functions.

As shown in FIG. 3, again for an output to be generated, a set of scene data 30, including, inter alia, a set of vertices (with each vertex having one or more attributes, such as positions, colours, etc., associated with it), a set of indices referencing the vertices in the set of vertices, and primitive configuration information indicating how the vertex indices are to be assembled into primitives for processing when generating the output, is provided to the graphics processor, for example, and in an embodiment, by storing it in the memory 6 from where it can then be read by the graphics processor 2.

This scene data may be provided by the application (and/or the driver in response to commands from the application) that requires the output to be generated, and may, for example, comprise the complete set of vertices, indices, etc., for the output in question, or, e.g., respective different sets of vertices, sets of indices, etc., e.g. for respective draw calls to be processed for the output in question. Other arrangements would, of course, be possible.

Then, in the present embodiment, an "early" primitive assembly stage (circuit) 31 operates to assemble primitives for processing using the provided set of indices referencing the vertices based on the provided primitive configuration information, to generate a sequence of assembled primitives, each primitive comprising at this stage an identifier for the primitive and a set of one or more vertex indices for the primitive. This operation will be discussed in more detail below.

The assembled primitives from the primitive assembly stage (circuit) 31 are then used to trigger the fetching and vertex processing (shading) 32 of attributes for the vertices for the assembled primitives. In the present embodiments the fetching of the vertex positions and the transforming of the positions for the vertices from the, e.g. "model" space in which they are initially defined, to the, e.g. "screen", space that the output image is being generated in is triggered and performed at this stage (but the fetching and shading of any other vertex attributes is triggered and performed at later stages of the graphics processing) Again, this operation will be discussed in more detail below.

There is then a "late" primitive assembly stage (circuit) 33 that assembles primitives for further processing from the sequence of primitives output by the early primitive assembly stage (circuit) 31 (and in particular using the indices for those primitives), by associating the primitives output by the early primitive assembly stage (circuit) 31 with the corresponding fetched and shaded vertex attributes from the vertex processing 32, to provide a sequence of assembled primitives, each primitive comprising an identifier for the primitive and the relevant fetched (and shaded) vertex attributes (positions) (and any other fetched data) for the vertices for the primitive. Again, this operation will be discussed in more detail below. Other vertex attributes (varyings), such as colours, transparency, etc. . . . , that are needed will be fetched (and as necessary "vertex shaded") later on in the pipeline, for example at the tiling stage (tiler).)

The assembled primitives with the fetched and processed vertex attributes (positions) from the late primitive assembly 32 are first passed to a tiler (tiling circuit) 34 for processing. (It is assumed in this regard that the graphics processor 2 in the present embodiments is a tile-based graphics processor and so generates respective output tiles of an overall output (e.g. frame) to be generated separately to each other, with the set of tiles for the overall output then being appropriately combined to provide the final, overall output.)

The tiler 34 performs the process of "tiling" to allocate the assembled primitives to primitive lists for respective render output regions (areas) which are then used to identify the primitives that should be rendered for each tile that is to be rendered to generate the output data (which may, e.g. be a frame to be rendered for display). For example, the tiler 34 may be implemented using a primitive list building unit which takes the assembled primitives as its input, builds primitive lists using that data, and stores the primitive lists in memory. The tiler may also cull certain primitives that are not visible.

The rasterisation stage (circuit) (rasteriser) 35 takes as its input the primitives (including their vertices), from the primitive list(s) for the tile being rendered, rasterises the primitive to fragments, and provides the fragments to a fragment processing stage (circuit) 36, which in this embodiment comprises a shader execution engine (a shader core). The shader execution engine is a programmable execution unit that performs fragment shading by executing fragment shading software routines (programs) for fragments received from the rasteriser 35.

Each graphics "fragment" that is shaded may correspond to a single pixel (picture element) in the final display (since as the pixels are the singularities in the final display, there may be a one-to-one mapping between the "fragments" the graphics processor operates on (renders) and the pixels of the display). However, it can be the case that there is not a one-to-one correspondence between a fragment and a display pixel, for example where particular forms of post-processing, such as down-scaling, are carried out on the rendered image prior to displaying the final image.

Each fragment will be processed by means of one or more execution threads which will execute the instructions of the shader program in question for the fragment in question. Typically, there will be multiple execution threads each executing at the same time (in parallel).

The output of the fragment processing 36 (the rendered fragments) is written to a tile buffer 37. Once the processing for the tile in question has been completed, then the tile will be written to the output data array 38 in memory, and the next tile processed, and so on, until the complete output data array has been generated. The process will then move on to the next output data array (e.g. frame), and so on.

The output data array 38 may typically be an image for a frame intended for display on a display device, such as a screen or printer, but may also, for example, comprise intermediate render data intended for use in later rendering passes (also known as a "render to texture" output), or for deferred rendering, or for hybrid ray tracing, etc.

As discussed above, the technology described herein and the present embodiments relate in particular to the primitive assembly process, and in particular to the idea of generating vertex packets as part of the primitive assembly process.

Figure 4:
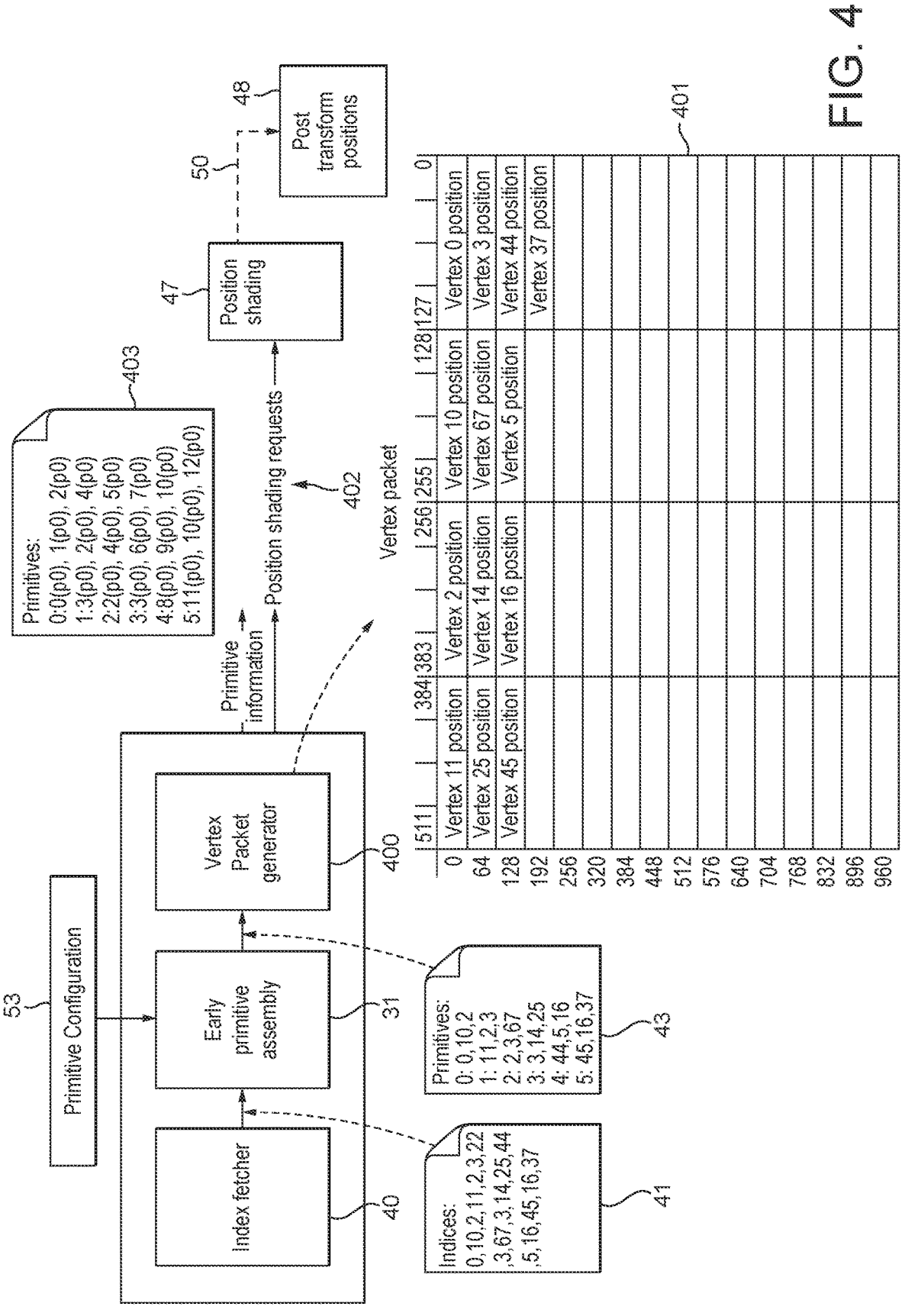
FIG. 4 shows certain parts of the operation of the graphics processor of FIG. 3 in an embodiment.

FIG. 4 shows an embodiment of this operation, and in particular shows the early primitive assembly stage (circuit) 31 of the graphics processor 2 shown in FIG. 3 and its operation in an embodiment of the technology described herein in more detail.

As shown in FIG. 4, the early primitive assembly process and circuit 31 includes an index fetcher (an index fetching circuit) 40 that fetches and outputs a sequence (stream) of indices 41 from the (stored) vertex index array defined and provided for the output being generated.

(As shown in FIG. 4, the same vertex index may appear more than once in the sequence of indices 41 for the output. It may also be the case that some vertices in the set of vertices for the output will not in fact be included in the sequence of indices for the output.)

The index fetcher 40 provides the sequence of indices 41 to the early primitive assembly stage (circuit) 31, which assembles complete primitives 43 from the stream of indices 41 provided by the index fetcher 40, in accordance with primitive configuration information 53 that defines the type of primitives to be assembled (e.g. whether the assembled primitives are to be in the form of triangles, triangle strips, triangle fans, points or lines, etc.). This primitive configuration information (primitive type definition) 53 may be provided, e.g., as part of a descriptor (metadata) for the output being generated.

The early primitive assembly stage (circuit) 31 is operable to output a sequence 43 of complete assembled primitives from the input stream of indices 41 according to the defined primitive type. At this stage, each (complete) primitive output by the early primitive assembly circuit 31 comprises an identifier for the primitive in the form of a sequence number for the primitive, and a sequence of vertex indices from the input index vertex stream, corresponding to the indices for the vertices to be used for the primitive.

In the present embodiment, the early primitive assembly circuit 31 is operable to discard any degenerate or incomplete primitives at this stage, such that only complete primitives (corresponding to the desired primitive type) will be output. The early primitive assembly circuit 31 may also be operable to subdivide more complex primitives into simpler primitives, such as triangles, lines or points, for output, if desired.

It should also be noted that at this stage, only the indices and the primitive configuration information provided to the early primitive assembly circuit (stage) will have been fetched from memory. At this point in the process, no vertex attributes have been fetched or processed (vertex shaded).

As shown in FIG. 4, the sequence 43 of complete assembled primitives from the early primitive assembly stage (circuit) 31 is provided to a vertex packet generator stage (circuit) 400.

The vertex packet generator 400 operates to generate vertex packets 401 comprising vertices of assembled primitives.

Thus, as illustrated in FIG. 4, the vertex packet generator 400 will allocate vertices of assembled primitives that are received from the earlier primitive assembly 31 to a respective vertex packet(s) 401 in turn. In the present embodiments, each vertex packet 401 has a maximum permitted capacity of vertices, such as 64 vertices, and once that capacity is reached, a new vertex packet is started.

FIG. 4 shows the exemplary content of a vertex packet 401 for the sequence 43 of primitives 0-5 illustrated in FIG.

4. It will be appreciated that as more primitives are assembled, more vertices will be added to the vertex packet 401 until it is full.

In the present embodiments, in order to try to avoid duplication of vertices within vertex packets, the vertex packet generation process keeps track of the vertices that have been added to a vertex packet, and checks whether the vertices for new primitives have already been included in a vertex packet using that vertex tracking information. In the present embodiments, the inclusion of vertices in vertex packets for the vertex packet generation process is tracked for a plurality of, e.g. four, vertex packets, such that it will not only be checked whether a vertex has already been included in the current vertex packet, it will also be determined whether the vertex has been included in up to three immediately preceding vertex packets.

In the present embodiments, the vertices of assembled primitives are added to vertex packets in turn (subject to avoiding any duplication of vertices in the vertex packets), as they appear in assembled primitives. Once a given vertex packet is full (has reached its threshold (maximum capacity) number of vertices), then a new vertex packet is started.

In the present embodiments, and as shown in FIG. 4, the vertex packet generator 400 also triggers the vertex shading of the position attributes 402 for the vertices that have been included in a vertex packet.

The vertex packet generator 400 also re-indexes the indices of the vertices for the assembled primitives to provide "vertex packet-based" indices for the vertices of the assembled primitives. Thus, as shown in FIG. 4, the vertex packet generator 400 will also output a sequence of assembled primitives 403, but with each primitive comprising a set of vertex indices that each identify the vertex packet that the vertex is present in and the position (index) of that vertex in the vertex packet in question. Thus, for example, and as shown in FIG. 4, the vertex packet generator will output for the first primitive (having the primitive index 0) comprising the vertices 0, 10, 2 (from the originally provided set of vertex indices), a corresponding set of vertex-packet-based indices, 0(p0), 1(p0), 2(p0), indicating its vertices.

To facilitate this the vertex packets generated by the vertex packet generator 400 are correspondingly indexed in the sequence that they are generated, to thereby provide appropriate identifiers (indexes) for the different vertex packets (and that can be used to identify and track the different vertex packets).

Figure 5:
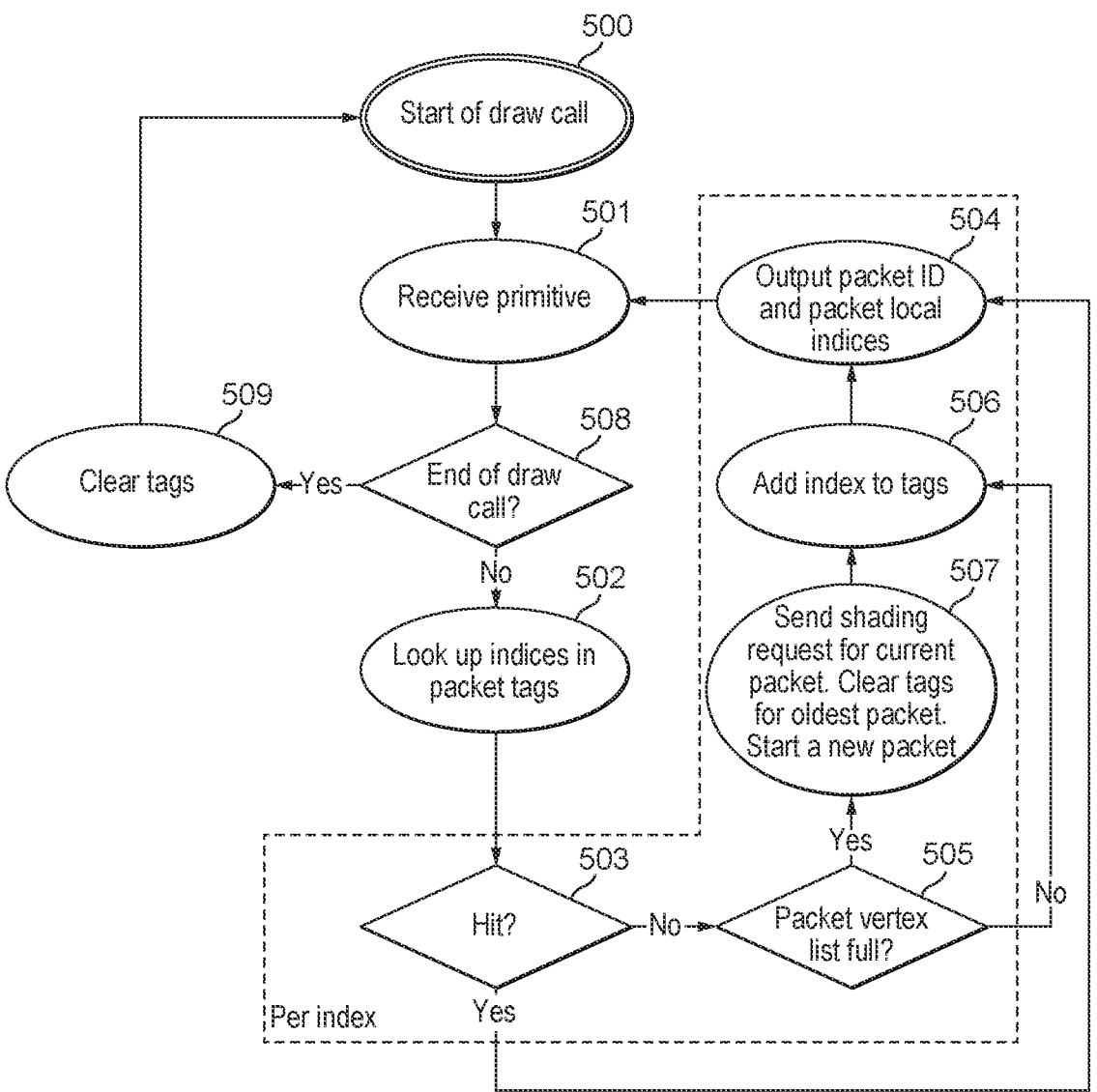
FIG. 5 shows certain parts of the operation shown in FIG. 4 in more detail.

FIG. 5 shows this operation of the vertex packet generator 400 in the present embodiments in more detail.

For the operation illustrated in FIG. 5, it is assumed that the primitives are assembled for respective draw calls, and that for each respective draw call for a render output, a separate sequence of primitives will be assembled and processed.

Thus, as shown in FIG. 5, once a new draw call is started (step 500) the vertex packet generator 400 will receive 501 the assembled primitives for the draw call from the early primitive assembly 31 in turn, and for each primitive, look up the vertex indices for the primitive in tracking information (tags) that is used to track which vertices have been included in a vertex packet (step 502).

As shown in FIG. 5, for each vertex index for a primitive, it is determined whether that vertex is already present in a vertex packet (step 503), and if the vertex is already present in a vertex packet, then the corresponding packet ID and packet local index for the vertex in question is output (step 504), for provision with and for the assembled primitive using the vertex-packet-based indexing scheme. On the other hand, when at step 503 it is determined that the vertex for a primitive is not already present in a vertex packet, it is then determined whether the current vertex packet is full (has reached its threshold maximum vertex capacity) (step 505).

When the current vertex packet is not full, then the vertex is added to the current vertex packet and the (initial, non-vertex packet based) index for the added vertex is added to the vertex tracking information (tags) for the vertex packet in question (step 506). The corresponding vertex packet ID and packet local index is again then output for the vertex in question (step 504).

On the other hand, when in step 505 it is determined that the current vertex packet is full (i.e. such that a new vertex packet should be started), then the appropriate position shading request is sent for the packet which has just become full (step 507).

A new packet is then started after clearing the vertex index tracking information (tags) for the oldest vertex packet (step 507).

(As discussed above in the present embodiments, the vertex packet vertex tracking is performed for a queue of, e.g. four vertex packets, with new vertex packets (when required) being added to the end of the queue and correspondingly the oldest vertex packet being evicted from the head of the queue. Once a packet is evicted from the queue it is no longer tracked and checked whether later assembled primitives include vertices within that evicted vertex packet. Rather, if a later assembled primitive includes again a vertex that was in a vertex packet which has been evicted, that vertex will simply be added again to the current vertex packet.) As before, the index for the new vertex is added to the tracking information for the new vertex packet (step 506), and the new vertex packet ID and packet local index for the vertex in question is output (step 504) for association with the assembled primitive.

As discussed above, it may not be necessary to wait until a packet is full before starting to send vertex shading requests. Vertex shading requests could (additionally or alternatively) be sent whilst a packet is being generated (e.g. in response to a predetermined number of vertexes being added to the packet currently being generated). For example, a shading request could be (and in an embodiment is) triggered for the current packet (to which the vertices having a "miss" at step 503 are added) after a predetermined number of "misses" occur (for example corresponding to the number of execution threads of the shader core, e.g. 16).

Vertex shading is in an embodiment not performed (repeated) for those vertices which are determined to be already present in a vertex packet (of the e.g. four vertex packets) being tracked, i.e. for which a "hit" occurs at step 503, since shading will have already been performed for those vertices.

This operation shown in FIG. 5 is repeated for all the primitives within the draw call, until the end of the draw call is reached (step 508), at which point all the vertex tracking information is cleared (step 509), so that the process can be started again for the next draw call (if any).

This process will be repeated for each draw call of a render output to be generated (and for subsequent render outputs, as appropriate).

The position shading request 402 for a vertex packet will trigger the appropriate position shading for the vertices in the vertex packet, to thereby generate and store in memory a vertex packet comprising the vertex shaded (transformed) positions for the vertices of the vertex packet.

The position shading request 402 for a vertex packet is sent to an appropriate position shading stage (position shader (circuit)) 47 (an appropriate execution (shader) core(s) of the graphics processor) that executes appropriate position shading programs for the positions (position attributes) of vertices, to transform the positions from their "model" space definitions to the appropriate "screen" space that the output is being generated with respect to.

The position shading request for the vertices of a vertex packet will indicate, inter alia, the indices from the initially provided set of indices for the draw call of the vertices in the vertex packet, so that the appropriate vertices to be position shaded for the vertex packet can be identified. The request may also indicate, for example, and in an embodiment, the position shading operation to be performed (the position shader to be executed), and where the vertex packet, containing the shaded positions for the vertices of the vertex packet, should be stored.

Each vertex will be processed (position shaded) by means of one or more execution threads which will execute the instructions of the (position) shader program in question for the vertex in question. Typically, there will be multiple execution threads each executing at the same time (in parallel).

The position shading process (position shader) 47 executes the position shading programs on a respective programmable processing (execution) core (shader core) or cores of the graphics processor 2.

In the case where the execution (shader) core or cores of the graphics processor are operable to execute plural execution threads (each representing an individual vertex) as a group (warp) together, then the position shading for the vertex packets is in an embodiment performed by executing the position shading as, and for, one or more thread groups (warps). For example, where a vertex packet has a capacity of 64 vertices, and the execution core(s) are operable to execute groups (warps) of 16 threads, then the position shading for a given vertex packet will be performed by issuing four respective thread groups (warps) for execution to perform that position shading.

The processed vertex packets, containing the shaded (transformed) positions, are stored 50 in a post-transform position buffer 48, in memory, from where they can then be fetched for use.

FIG. 6 shows an exemplary vertex packet comprising the transformed positions for all of its vertices, as would, e.g., be generated and stored after the position shading process.

As well as generating the appropriately transformed positions for the vertices, the position shading may also generate other parameters, such as one or more of: variable rate shading parameter values, a point size, line width, and/or a layer ID, etc., if desired. In this case, these additional parameters are in an embodiment also stored with the transformed positions in the vertex packets post transform position buffer 48. FIG. 11 illustrates this, and shows an "extended" vertex packet containing both positions and other attributes for the vertices that it relates to.

Once the vertex packets, including the transformed vertex positions for the vertices of the vertex packets have been generated and stored in memory, they can then be used when and for processing the assembled primitives.

Figure 7:
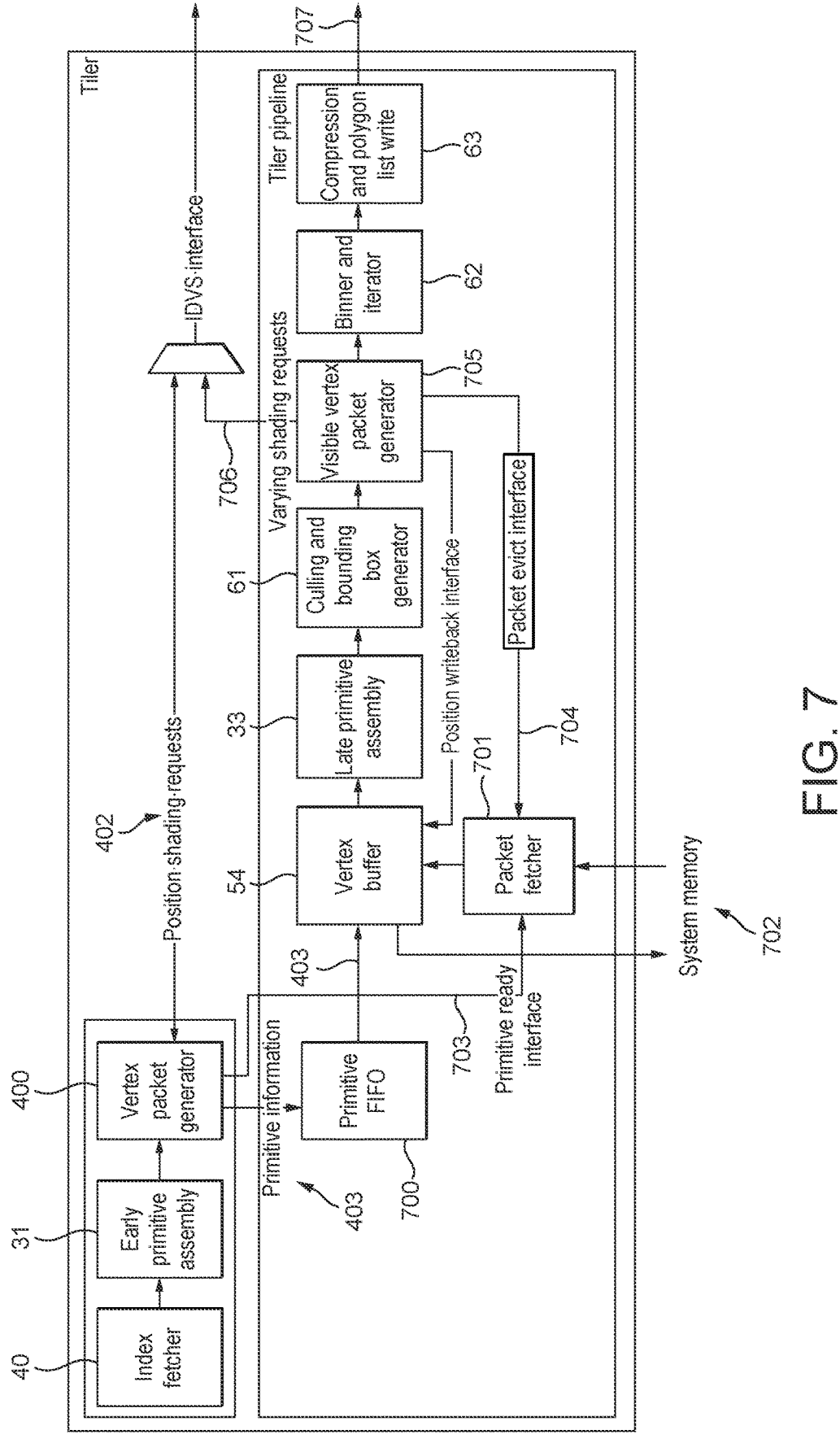
FIG. 7 shows further parts of the operation of the graphics processor of FIG. 3 in an embodiment.

FIG. 7 shows aspects of this operation in an embodiment of the technology described herein.

FIG. 7 shows in particular the next stage of the graphics processing pipeline, which in the present embodiments, comprises a tiling stage of the graphics processing pipeline.

In this regard, the present embodiments relate to and use so-called "tile-based" rendering. In tile-based rendering, the two-dimensional render output (i.e. the output of the rendering process, such as an output frame to be displayed) is rendered as a plurality of smaller area regions, usually referred to as "rendering tiles". In such arrangements, the render output is typically divided (by area) into regularly-sized and shaped rendering tiles (they are usually rectangles, e.g. squares). (Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area regions.)

In a tile-based graphics processing pipeline, the geometry (primitives) for the render output being generated is sorted into regions of the render output area, so as to allow the geometry (primitives) that need to be processed for a given region of the render output to be identified. This sorting allows primitives that need to be processed for a given region of the render output to be identified (so as to, e.g., avoid unnecessarily rendering primitives that are not actually present in a region). The sorting process produces lists of primitives to be rendered for different regions of the render output (referred to herein as "primitive" lists but also commonly referred to as "polygon" or "tile" lists).

A render output region for which a primitive list is prepared could be a single rendering tile, or a group of plural rendering tiles, etc.

Once the primitive lists have been prepared, the primitive lists can then be used by the graphics processor to perform the actual rendering of the rendering tiles, with the information stored in the primitive lists being used to identify the primitives to be processed for each rendering tile when generating the desired render output, e.g. to display the frame.

The process of preparing primitive lists for regions of the render output thus basically involves determining the primitives that should be processed for a given render output region. This process is usually carried out by determining (at a desired level of accuracy) the primitives that intersect (i.e. that will appear (at least in part) within) the render output region in question, and then preparing a list of those primitives for future use by the graphics processing system. Thus, for each primitive to be processed, the graphics processor uses the shaded vertex positions for each primitive to determine which region(s) of the render output the primitive at least partially covers (and so should therefore be rendered for).

As will be discussed in more detail below, in the present embodiments, the tiling stage uses, inter alia, the transformed positions for the vertices of the assembled primitives from the generated vertex packets to determine whether assembled primitives are (potentially) visible within the output being generated (and so should be processed further for the output being generated), and, correspondingly, adds any primitives that are determined to be (potentially) visible at the tiling stage appropriately to primitive lists from where they can then be read and processed further.

As shown in FIG. 7, the assembled primitives 403 from the vertex packet generator 400 (i.e. with their vertices indexed using the vertex-packet-based indexing scheme) are provided to a late primitive assembly stage/circuit 33, via a FIFO 700 (which acts as a latency hiding mechanism to allow time for the corresponding position shading to be completed for the vertex packets containing the vertices of the assembled primitives).

The late primitive assembly stage 33 adds the transformed positions to the assembled primitives output by the early primitive assembly stage/circuit 31, and provides the so-assembled primitives to subsequent stages of the tiling process. As shown in FIG. 7, the late primitive assembly stage 33 acquires the transformed positions for the assembled primitives for this purpose from a vertex buffer 54 that stores the transformed positions for vertices of assembled primitives for use then by the late primitive assembly stage 33.

In the present embodiments, the vertex buffer 54 is configured to store a number of entire generated vertex packets (including the transformed positions). For example, the vertex buffer 54 may store up to seven vertex packets. Other arrangements would, of course, be possible.

To facilitate this operation, as shown in FIG. 7, the graphics processor also includes an appropriate packet fetcher (packet fetching circuit) 701 that is, as shown in FIG. 7, configured to load vertex packets (when they are ready) from the system memory 702 (where they will have been stored following the position shading triggered by the vertex packet generator 400) into the vertex buffer 54 for use by the late primitive assembly process 33. The packet fetcher 701 is configured to load vertex packets into the vertex buffer 54 as they are required and ready, and, correspondingly, to evict vertex packets from the vertex buffer 54 (to provide room for new vertex packets) when they are no longer required in the vertex buffer 54.

To do this, as shown in FIG. 7, the packet fetcher 701 receives, inter alia, signals 703 from the vertex packet generator 400 indicating when vertex packets have been completed and the corresponding position shading performed, such that they are ready to be loaded from the memory when required. In particular, the vertex packet generator 400 requests position shading (as discussed above) and waits until the response from the shader 47 (execution core) is received. Once all outstanding shading requests for a packet have completed, the vertex packet generator sends a "packet ready" signal 703 to the packet fetcher.

The packet fetcher 701 also receives appropriate vertex packet evict signals 704 from a visible vertex packet generator stage/circuit 705 as shown in FIG. 7, indicative of when a vertex packet is no longer required in the vertex buffer 54 and so can be evicted from the vertex buffer 54. This will be discussed in more detail below.

The vertex packet fetcher 701 is in general configured and operable to maintain a set of vertex packets in the vertex buffer 54 such that the required transformed positions for assembled primitives to be processed will be expected to be present in the vertex buffer 54 when the primitives fall to be processed by the late primitive assembly stage 33. As discussed above, the primitive FIFO 700 assists in this by, in effect, delaying the provision of the assembled primitives to the late primitive assembly 33, to thereby allow the necessary vertex position shading to be performed, and the so-generated vertex packet to be loaded into the vertex buffer 54 before a primitive that requires vertices in a vertex packet will be received and processed by the late primitive assembly stage 33.

Figure 8:
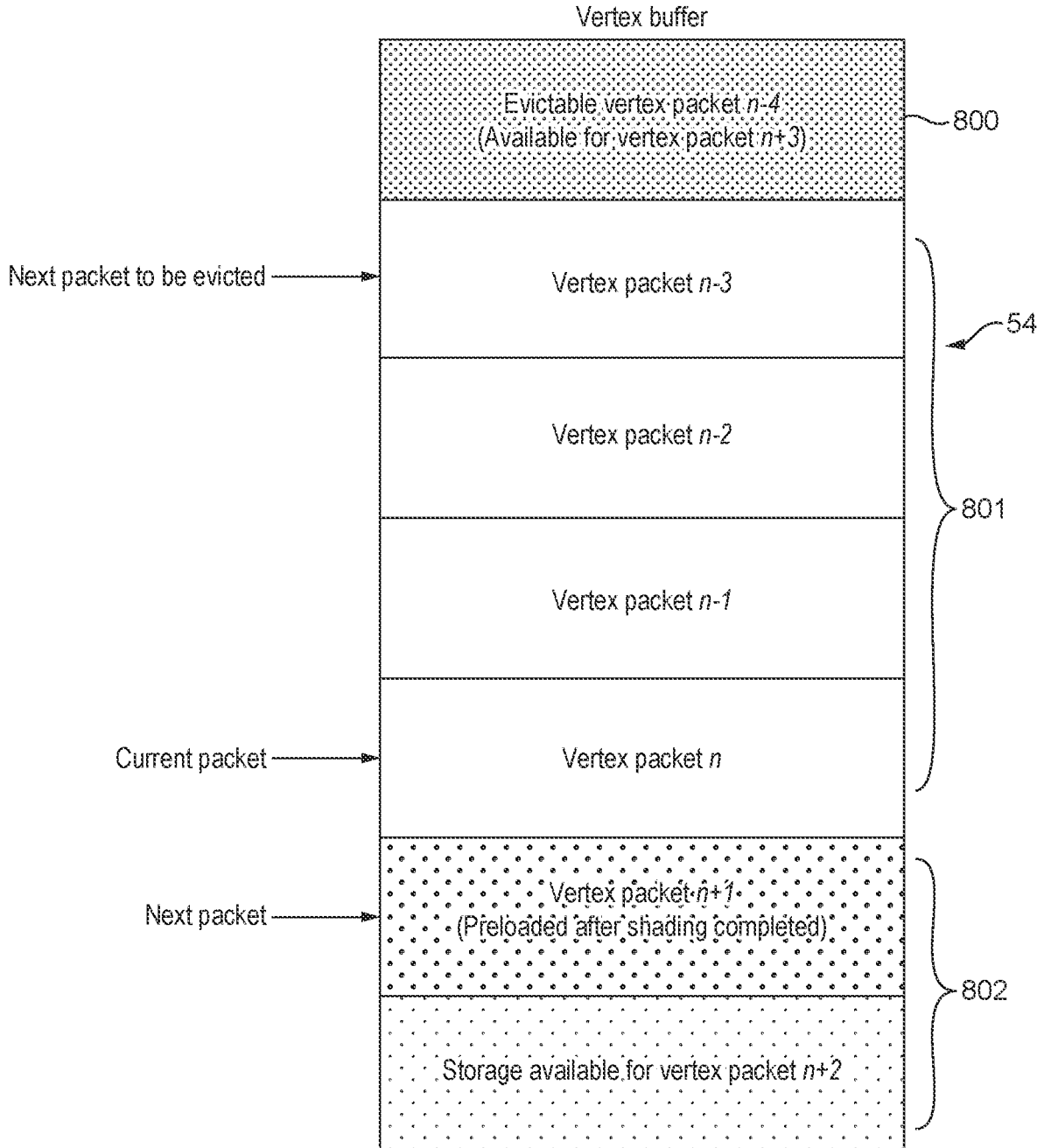
FIG. 8 shows an example content of a vertex buffer in an embodiment of the technology described herein.
Figure 9:
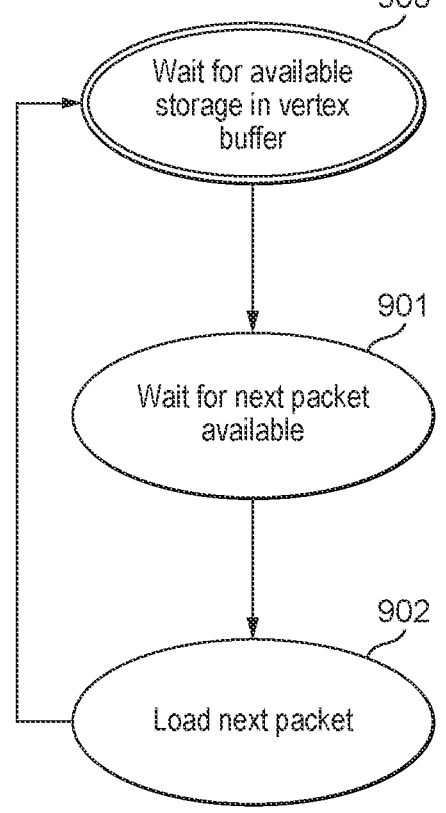
FIGS. 9 and 10 illustrate aspects of the vertex buffer operation in an embodiment.
Figure 10:
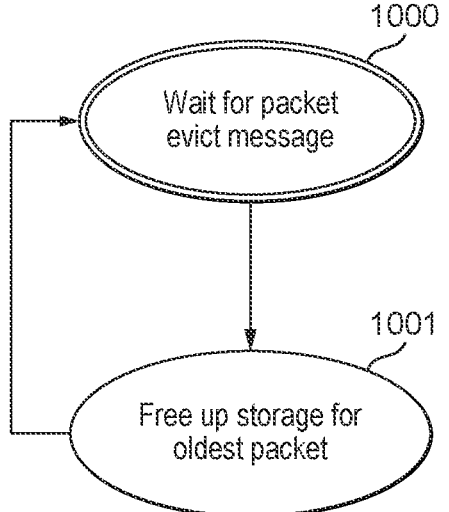

FIGS. 8, 9 and 10 illustrate this operation of the vertex buffer 54 and packet fetcher 701.

FIG. 8 shows an exemplary layout for the vertex buffer 54 as including a set of plural vertex packets, with the oldest vertex packet 800 being designated as being "evictable" and so able to be evicted to allow a new vertex packet to be loaded, and then a sequence of vertex packets 801 that may be being used for assembled primitives, and the oldest of which will be the next packet to be evicted. There are then vertex packets 802 that are not yet in use, but which are being prepared and so can be preloaded into the vertex buffer once they are ready.

FIG. 9 shows the operation for loading a vertex packet into the vertex buffer. Thus, as shown in FIG. 9, the packet fetcher 701 will wait for there to be storage available in the vertex buffer for a new vertex packet (step 900). It will then, if necessary, wait for the next vertex packet to be available in memory (i.e. to have its position shading completed) (step 901), and once the next packet is available, load that vertex packet into the vertex buffer (step 902).

FIG. 10 shows the corresponding vertex packet "eviction" process. In this case, the vertex fetcher 701 will wait for a "packet evict" message (step 1000), and in response to that free up the storage used for the vertex packet in question in the vertex buffer (so that it is available for use for a vertex new packet) (step 1001).

As discussed above, the sequence 43 of complete assembled primitives from the early primitive assembly stage (circuit) 31 is provided (via the FIFO 700) to the late primitive assembly stage (circuit) 33.

It may also be checked at this stage whether the required vertex packets containing the vertices of the assembled primitives are present in the vertex buffer 54 (and to, if necessary, stall the processing of the sequence of assembled primitives if the vertices for an assembled primitive are not present in the vertex buffer 54). This check may be based on, for example, and in an embodiment, an indication of which vertex packets the vertices of the assembled primitives are present in, and an indication of which packets are stored in the vertex buffer. In an embodiment it is tracked whether vertex packets (which have been generated and for which vertex processing has been performed) have (yet) been stored (fetched to) in the vertex buffer (from which tracking, since the packets are loaded into and evicted from the vertex buffer 54 in the order they are generated, and since the vertex buffer 54 stores a limited number of packets, it can be determined which packets are present in the buffer). Alternatively there could be maintained a record, such as a bitmap, of those vertex packets that are already stored in the vertex buffer 54 to facilitate this check.

(As discussed above, the expectation is that the loading of vertex packets into the vertex buffer 54 should be able to be done sufficiently in advance that the vertex packet(s) containing the vertices for an assembled primitive should be present in the vertex buffer 54 by the time the assembled primitive falls to be processed by the later primitive assembly stage (circuit) 33.)

The late primitive assembly stage/circuit 33 associates each assembled primitive in the sequence 43 with the corresponding transformed positions for the vertices for the primitive in question from the vertex buffer 54, and accordingly outputs a corresponding sequence of assembled primitives, which primitives, at this stage, now each comprise the primitive identifier and a sequence of shaded (transformed) positions for the primitives in the sequence. The so-assembled primitives are then sent to the next stage of the tiling process for tiling (and subsequently rasterising and rendering, as discussed above with reference to FIG. 3).

As shown in FIG. 7, the tiling process first comprises a culling and bounding box generator stage/circuit 61, which is followed by a visible vertex packet generator 705, which is then followed by a binner and iterator stage/circuit 62.

There is then a primitive (polygon) list writing circuit 63, that writes the primitives to primitive lists, e.g. in memory, for future use.

The culling and bounding box generator 61 generates appropriate bounding boxes for the assembled primitives output by the late primitive assembly stage/circuit 33, and also operates to identify any primitives that can be culled from further processing on the basis of their (potential) visibility. This culling may comprise, for example, front/ back-face culling, frustum culling, and/or sample aware culling, etc.

The bounding box generation uses the provided positions for the assembled primitives to generate appropriate bounding boxes for the primitives. In the present embodiment, bounding boxes at the resolution of the individual tiles that the output is divided into for rendering purposes are used, but other arrangements would, of course, be possible.

The culling process determines whether a primitive is (potentially) visible or not. For any primitive that is determined not to be potentially visible, the primitive is culled, but otherwise the primitive is retained and passed on for processing.

The output from the culling and bounding box generation comprises for each primitive an identifier for the primitive, a set of vertex indices for the primitive, and bounding box information for the primitive (in the present case in the form of which rendering tile or tiles the primitive falls within).

The primitives with their bounding boxes are then passed to a visible vertex packet generator 705 that stores in memory vertex packets containing both transformed positions and vertex shaded other attributes (varyings) for vertices of primitives that have passed (and based on the vertices of primitives that have passed) the culling stage 61 (so that that data is available for use for later stages of the graphics processing, outside of the tiling process). When a primitive is visible, the visible vertex packet generator checks if the vertices are already added to a packet. If it's in a packet, it will replace the vertex ID with an internal ID, which is used when accessing the data for the vertex. If it's not in a packet, the visible vertex packet generator allocates storage for the vertex in a packet and generates an internal ID for accessing that vertex. It will then signal back to the vertex buffer, which will write the position to the proper location in the packet. It will also issue a varying shading request, where the output of the shading is written directly to the packet.

Thus, as shown in FIG. 7, the visible vertex packet generator 705 triggers vertex attribute processing (vertex shading) 706 for any remaining (non-position) attributes (varyings) of vertices belonging to primitives that have passed the culling process.

Again this further vertex shading of other vertex attributes (varyings) is performed by sending appropriate requests for that processing to an appropriate vertex shading process of the graphics processor. (The vertex indices are sent from the packet generation down the pipeline to the visible vertex packet generator to facilitate this.) As previously described for position shading, these varying shading requests are accumulated and sent in groups of 16 vertices (1 warp).

The processed other vertex attributes (varyings) are then added appropriately to the generated vertex packets, such that the vertex packets then store both the transformed positions and other processed vertex attributes (varyings) for the vertices that they relate to.

As shown in FIG. 7, the visible vertex packet generator 705 also sends appropriate vertex packet evict signals 704 to the packet fetcher 701 to indicate when vertex packets may be (safely) evicted from the vertex buffer 54. (Once the last primitive using vertices from the oldest packet has been processed, and the position data written from the vertex buffer to the vertex packet in memory, the packet can be evicted.)

To facilitate this operation, the vertex packet generation process includes with the sequence of assembled primitives an indication of when no more assembled primitives will use a particular vertex packet (after all the assembled primitives that will use a vertex packet have been included in the sequence of assembled primitives). In the embodiment shown in FIG. 7, this indication is provided by the vertex packet generator 400 when a vertex packet is evicted from the vertex packet "queue" as the vertex packets are being assembled and sent for vertex shading (i.e. at step 507 in FIG. 5).

When the visible vertex packet generator sees the indication that no more assembled primitives that will use a vertex packet will follow in the sequence of assembled primitives, then it can determine that all assembled primitives that will use a particular vertex packet have passed the late primitive assembly, and in particular the culling and bounding box generation, stages, such that there will be no more primitives that will require the vertex packet from the vertex buffer. It accordingly then sends a vertex packet evict signal 704 to the packet fetcher 701, to indicate that the vertex packet in question can be safely evicted from the vertex buffer 54.

The primitives with their bounding boxes are then passed to the binning iterator stage/circuit 62, which operates to identify using the bounding boxes for the primitives which primitive lists the primitives should be listed in (by comparing the bounding boxes for the primitives with the respective primitive list regions), and outputs the respective primitives and their target primitive list(s) (bin(s)).

The primitive (polygon) list writing stage/circuit 63 then writes 707 the primitives into the respective primitive (polygon) lists in memory. As shown in FIG. 7, the primitive lists may be compressed before being written to memory.

The above-described processing in FIG. 7 up to and including the preparation and writing of the primitive lists 707 can be considered to be a sequence of appropriate geometry processing (geometry stages) of the overall graphics processing sequence and graphics processing pipeline that is executed when generating an output.

As will be appreciated, there will then be subsequent processing stages that are performed once the primitive lists have been prepared (and that can correspondingly be considered to be a sequence of fragment processing stages (fragment stages) that are performed when generating an output).

As the present embodiments use tile-based rendering, these fragment stages will be performed for respective tiles of the output being generated separately.

These "fragment stages" may, for example, and in an embodiment, start with a primitive (polygon) list reader stage/circuit reading the primitive list or lists applying to the tile that is being processed and outputting (providing to the subsequent processing stage) a sequence of primitives to be processed for the tile in question.

There may then be a vertex fetcher stage that is operable to fetch vertex attributes, and in particular the appropriately vertex shaded positions, for the primitives provided by the primitive list reader for the tile being processed.

The sequence of primitives may then be provided to a triangle (primitive) setup stage/circuit that performs any required primitive (triangle) setup processing, such as deriving line equations for the edges of the primitives.

Once primitive (triangle) setup has been performed for a primitive, the primitive may be provided to a rasteriser for rasterisation into graphics fragments, which fragments are then provided to appropriate rendering (fragment processing) stages/circuits of the pipeline. The rendering (fragment processing) that is performed can comprise any suitable and desired rendering (fragment processing) that may be performed for a graphics processing pipeline. It in an embodiment comprises at least performing fragment shading of the fragments.

The rasteriser and rendering (fragment processing) can be performed in any suitable and desired manner, such as, and in an embodiment, in the normal manner for the graphics processor and graphics processing pipeline in question.

The rendered fragment data is then appropriately output to memory, from where it may then be used, e.g. for display or other purposes. (The processed fragment data will be written out to memory via an appropriate tile buffer, as the graphics processor and pipeline performs tile-based graphics processing.)

Figure 12:
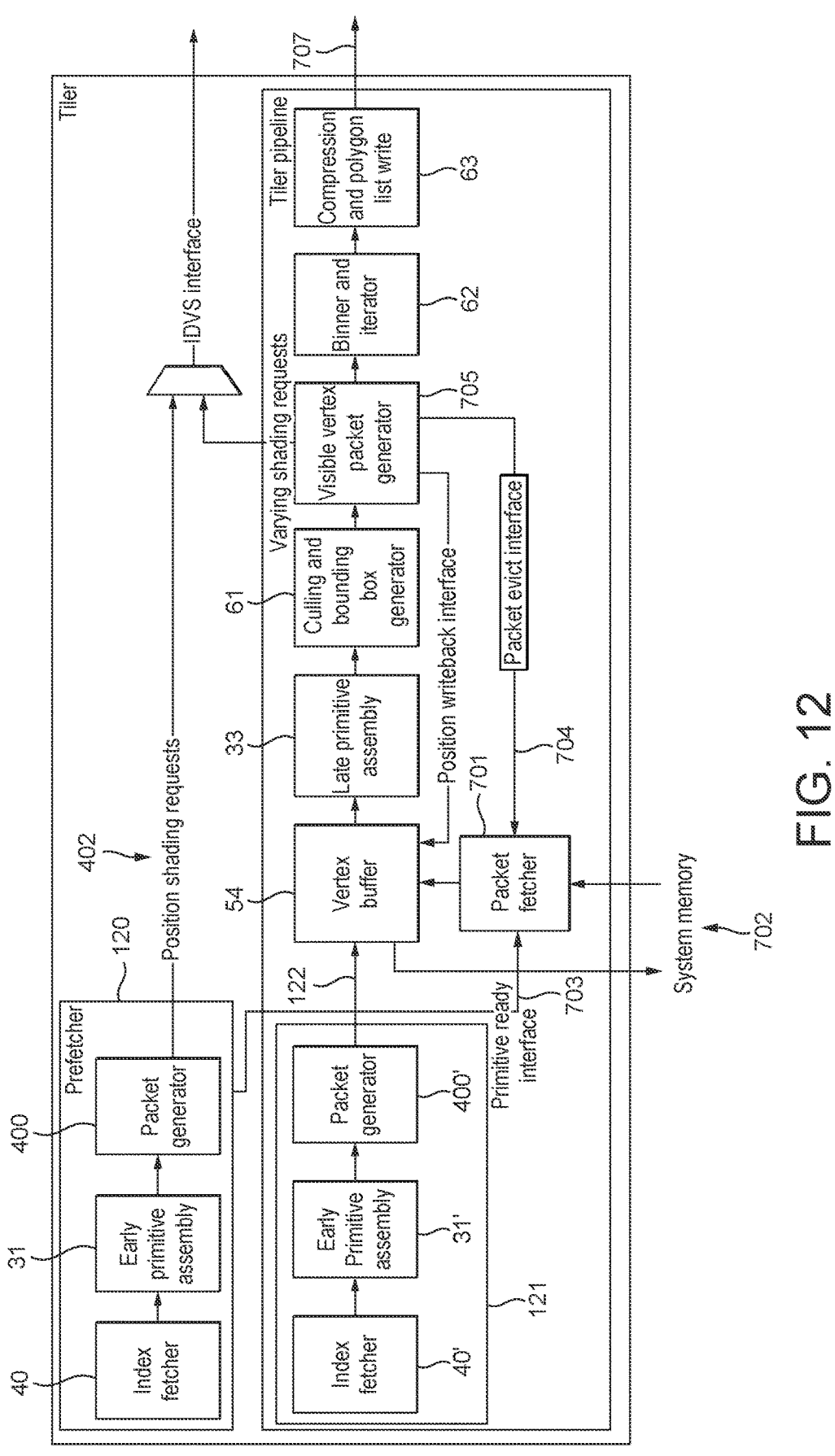
FIG. 12 shows certain parts of the operation of the graphics processor of FIG. 3 in another embodiment.
Figure 13:
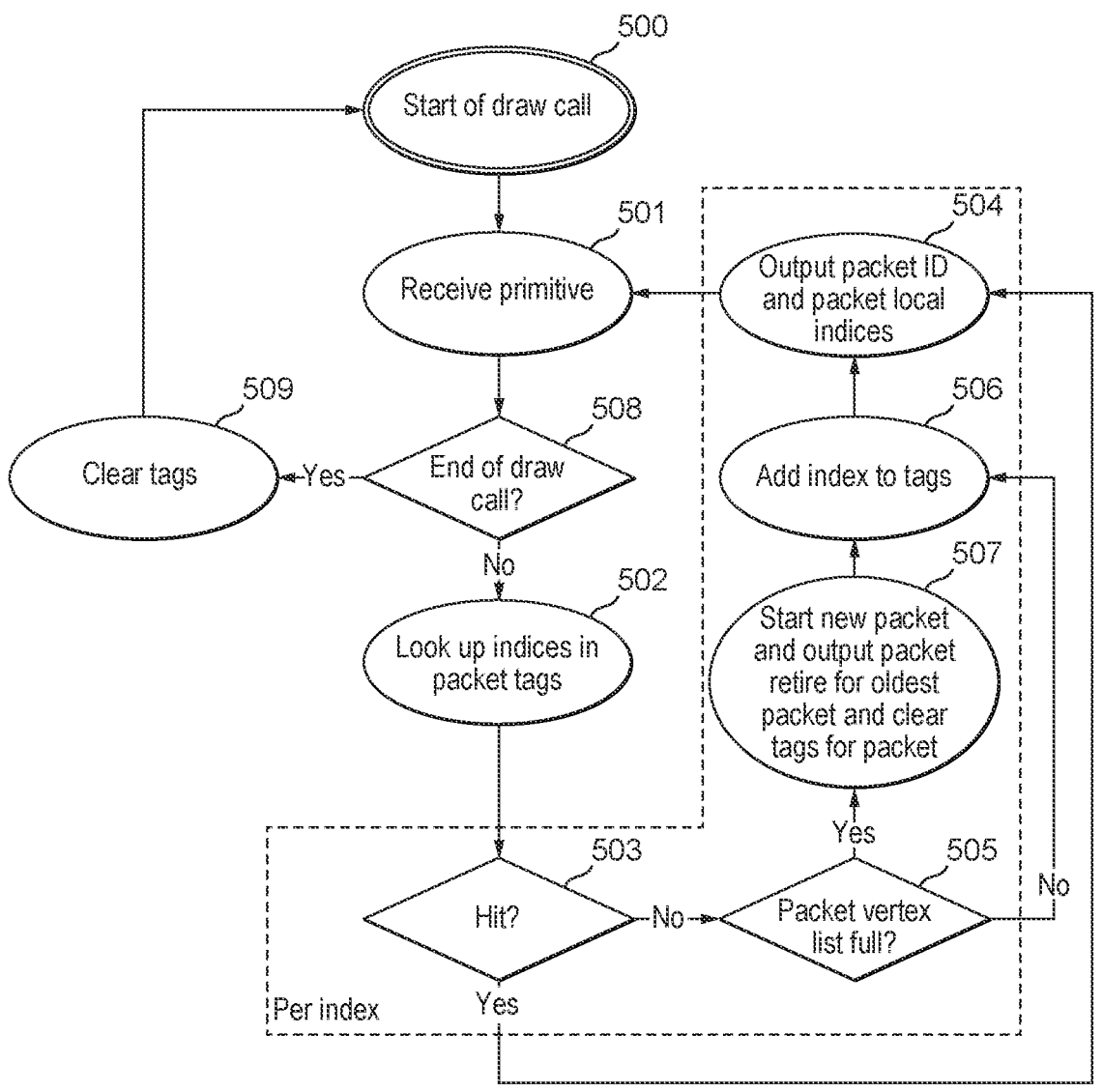
FIG. 13 shows certain parts of the operation shown in FIG. 12 in more detail.

FIGS. 12 and 13 show an alternative embodiment of the technology described herein, in which rather than providing the assembled primitives from the early primitive assembly stage to the late primitive assembly via a FIFO as a latency hiding mechanism, instead the early primitive assembly process is, in effect, repeated at a later time to regenerate the sequence of assembled primitives to provide an appropriate latency hiding mechanism.

Thus, in this case, as shown in FIG. 12, there will still be an early primitive assembly process 120 that operates as described above with reference to FIGS. 4, 5, 6 and 7 to trigger the appropriate position shading vertices for assembled primitives and the corresponding generation and storing of the vertex packets in memory, and their fetching into the vertex buffer 54 as they are ready.

In this embodiment, this operation can effectively be considered to be a "prefetch", operation that triggers the generation and fetching of the vertex packets into the vertex buffer 54.

However, as shown in FIG. 12, rather than providing the sequence of assembled primitives generated by this first early primitive assembly operation 120 to the late primitive assembly stage 33, instead a second sequence of early primitive assembly 121 is performed to regenerate the sequence of assembled primitives and thereby provide that (regenerated) sequence of assembled primitives 122 to the late primitive assembly stage 33.

In the present embodiment, both early primitive assembly processes are started at the same time and run as fast they can. Since primitives will be stalled on the input of the vertex buffer (as the vertex packets are not ready and loaded yet), the second early primitive assembly process will stall due to back pressure until vertex packets are processed and loaded and late primitive assembly can progress, thereby, effectively, ensuring that the pre-fetching is completed before an assembled primitive is processed.

Alternatively, the second, later early primitive assembly process 121 could be performed with a suitable delay between that process being performed and the first, early primitive assembly process 120 that triggers the generation and fetching of the vertex packets into the vertex buffer 54 being performed, so as to (try to) ensure that the primitives assembled by the second early primitive assembly process 121 will not be processed until the corresponding vertex packet or packets have been generated and fetched into the vertex buffer 54. Such delay (latency hiding) can be achieved in any suitable and desired manner.

The second, later early primitive assembly process 121 operates essentially in the same manner as for the first primitive assembly process 120, but does not trigger any vertex shading for the vertex packets (as that has already been done by the "pre-fetch", first early primitive assembly process 120).

Thus, as shown in FIG. 12, the second early primitive assembly process and circuit 121 includes an index fetcher (an index fetching circuit) 40' that fetches and outputs a sequence (stream) of indices from the (stored) vertex index array defined and provided for the output being generated.

The index fetcher 40' again provides the sequence of indices to an early primitive assembly stage (circuit) 31', which assembles complete primitives from the stream of indices provided by the index fetcher, in accordance with primitive configuration information that defines the type of primitives to be assembled.

Again, the early primitive assembly stage (circuit) 31' is operable to output a sequence of complete assembled primitives (and to discard any degenerate or incomplete primitives, etc.).

As shown in FIG. 12, the sequence of complete assembled primitives from the early primitive assembly stage (circuit) 31' is again provided to a vertex packet generator stage (circuit) 400', that operates to generate vertex packets comprising vertices of assembled primitives and to re-index the indices of the vertices for the assembled primitives to provide "vertex packet-based" indices for the vertices of the assembled primitives, in the same way as discussed above with reference to FIGS. 4 to 7.

However, the vertex packet generator 400' of this second, later early primitive assembly process 121 does not also trigger the vertex shading of position attributes for the vertices that have been included in a vertex packet (as that has already been done by the "pre-fetch" early primitive assembly process 120).

FIG. 13 shows the operation of the vertex packet generator 400' in the second early primitive assembly process 121 in more detail.

As can be seen from FIG. 13, the vertex packet generator 400' operation in the second early primitive assembly process 121 is very similar to the vertex packet generation process 121 described above with reference to FIG. 5 (and so steps that are the same as described with reference to FIG. 5 will not be described again here).

However, as shown in FIG. 13, in the case of the second early primitive assembly process 121, when in step 505 it is determined that the current vertex packet is full (i.e. that a new vertex packet should be started), then a new vertex packet is started, but unlike in the operation illustrated in FIG. 5, rather than sending an appropriate position shading request for the oldest vertex packet for which the tracking information is being maintained (that is now being evicted from the "queue"), instead only a vertex packet "retire" indication is associated with the assembled sequence of primitives for that oldest vertex packet for which the vertex tracking information is being maintained (step 507').

(As discussed above, the vertex packet "retire" indication is then used by the visible vertex packet generator 705 (see FIG. 12) to identify and signal when the vertex packet can be evicted from the vertex buffer 54.)

As shown in FIG. 12, the processing of the (regenerated) sequence of assembled primitives is then performed in the same manner as described in relation to FIG. 7.

It should be noted here that although the Figures only show a few primitives, vertices, indices, positions, etc., for clarity purposes, the number of primitives, vertices, indices, for a given output may be, and typically will be, significantly higher.

As will be appreciated by those skilled in the art, the technology described herein, in embodiments, can provide a more efficient graphics processing pipeline, in particular with respect to the processing and handling of vertex attributes for primitives being processed. This is achieved, in embodiments of the technology described herein, by generating vertex packets based on vertices included in assembled primitives, and performing the vertex attribute processing and the fetching and use of processed vertex attributes for processing of primitives on a vertex packet-by-vertex packet basis.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processor that executes a graphics processing pipeline to generate an output, in which a set of vertices to be used for primitives to be processed when generating the output, each vertex having associated with it a set of one or more vertex attributes, together with a set of vertex indices referencing vertices in the set of vertices and primitive configuration information indicating how the vertex indices are to be assembled into primitives for processing when generating the output, are provided; the method comprising:

performing a first primitive assembly process to assemble a sequence of one or more of primitives to be processed when generating the output from the set of vertex indices provided for the output based on the primitive configuration information provided for the output, each assembled primitive of the sequence of assembled primitives comprising an identifier for the primitive and a set of one or more vertex indices for the primitive;

generating one or more vertex packets using the vertex indices for the assembled primitives, each vertex packet comprising a plurality of vertices of the assembled primitives;

wherein the generating one or more vertex packets using the vertex indices for the assembled primitives comprises:

allocating vertices for assembled primitives to a vertex packet until a threshold number of vertices have been allocated to the vertex packet; and triggering vertex attribute processing for the vertices of the vertex packet, to thereby generate a vertex packet comprising processed vertex attributes for the vertices of the vertex packet;

and thereafter:

performing a second primitive assembly process to assemble the same sequence of one or more of primitives to be processed when generating the output from the set of vertex indices provided for the output based on the primitive configuration information provided for the output;

generating one or more vertex packets using the vertex indices for the assembled primitives from the second primitive assembly process, each vertex packet comprising a plurality of vertices of the assembled primitives;

wherein the generating one or more vertex packets using the vertex indices for the assembled primitives from the second primitive assembly process comprises:

allocating vertices for assembled primitives to a vertex packet until a threshold number of vertices have been allocated to the vertex packet;

and providing the assembled primitives from the second primitive assembly process and the generated vertex packets comprising the processed vertex attributes generated by the first primitive assembly process to later stages of the graphics processing pipeline that is being executed by the graphics processor for processing.

2. The method of claim 1, further comprising:

for each of a plurality of vertex packets, tracking which vertices have been allocated to the vertex packet; and using that tracking information to determine whether a new vertex has already been allocated to one of those existing vertex packets or not.

3. The method of claim 1, comprising:

triggering the vertex attribute processing for the vertices of a vertex packet in response to a particular number of vertices being added to the vertex packet.

4. The method of claim 1, wherein the vertex attribute processing that is triggered for the vertices of a vertex packet comprises processing only the positions of the vertices of the vertex packet.

5. The method of claim 1, further comprising providing for an assembled primitive, an identifier for the primitive and a set of one or more vertex indices for the primitive, where each vertex index for the primitive comprises a vertex packet identifier and an identifier for the vertex in the vertex packet.

6. The method of claim 1, further comprising storing the vertex packets in a vertex buffer for use by later stages of the graphics processing pipeline, and wherein the generated vertex packets are fetched into the vertex buffer for use, and evicted from the vertex buffer, on a vertex packet-by-vertex packet basis.

7. The method of claim 6, further comprising:

tracking the use of vertex packets in the vertex buffer for assembled primitives, and after it is determined from that tracking that processed vertices in a vertex packet will no longer be required from the vertex buffer for any assembled primitives, evicting the vertex packet from the vertex buffer.

8. The method of claim 6, comprising:

once it has been determined that all the assembled primitives that will use a vertex packet have been assembled and included in the sequence of assembled primitives, associating an indication of that with the sequence of assembled primitives; and a later stage of the graphics processing pipeline when it sees the indication for a vertex packet, signalling to a vertex packet eviction process that the vertex packet can be evicted from the vertex buffer.

9. The method of claim 8, wherein the graphics processor performs tile-based processing and performs a culling process as part of the tiling process, and the signalling to the vertex packet eviction process to evict a vertex packet from the vertex buffer is performed after that culling process.

10. A graphics processor configured to execute a graphics processing pipeline to generate an output; the graphics processor comprising:

a primitive assembly circuit configured to perform a first primitive assembly process to assemble a sequence of one or more of primitives to be processed when generating an output from a set of vertex indices provided for the output, the set of vertex indices referencing vertices in a set of vertices provided for the output, each vertex having associated with it a set of one or more vertex attributes, based on primitive configuration information provided for the output, the primitive configuration information indicating how the vertex indices are to be assembled into primitives for processing when generating the output, each assembled primitive of the sequence of assembled primitives comprising an identifier for the primitive and a set of one or more vertex indices for the primitive;

a vertex packet generating circuit configured to generate one or more vertex packets using the vertex indices for the assembled primitives, each vertex packet comprising a plurality of vertices of the assembled primitives;

wherein the vertex packet generating circuit is configured to generate the one or more vertex packets using the vertex indices for the assembled primitives by:

allocating vertices for assembled primitives to a vertex packet until a threshold number of vertices have been allocated to the vertex packet; and triggering vertex attribute processing for the vertices of the vertex packet, to thereby generate a vertex packet comprising processed vertex attributes for the vertices of the vertex packet;

wherein the graphics processor is configured to thereafter:

perform a second primitive assembly process to assemble the same sequence of one or more of primitives to be processed when generating the output from the set of vertex indices provided for the output based on the primitive configuration information provided for the output;

generate one or more vertex packets using the vertex indices for the assembled primitives from the second primitive assembly process, each vertex packet comprising a plurality of vertices of the assembled primitives;

wherein the generating one or more vertex packets using the vertex indices for the assembled primitives from the second primitive assembly process comprises:

allocating vertices for assembled primitives to a vertex packet until a threshold number of vertices have been allocated to the vertex packet; and provide the assembled primitives from the second primitive assembly process and the generated vertex packets comprising the processed vertex attributes generated by the first primitive assembly process to later stages of the graphics processing pipeline that is being executed by the graphics processor for processing.

11. The graphics processor of claim 10, wherein the vertex packet generating circuit is configured to:

for each of a plurality of vertex packets, track which vertices have been allocated to the vertex packet; and use that tracking information to determine whether a new vertex has already been allocated to one of those existing vertex packets or not.

12. The graphics processor of claim 10, wherein the vertex packet generating circuit is configured to:

trigger the vertex attribute processing for the vertices of a vertex packet in response to a particular number of vertices being added to the vertex packet.

13. The graphics processor of claim 10, wherein the vertex attribute processing that is triggered for the vertices of a vertex packet comprises processing only the positions of the vertices of the vertex packet.

14. The graphics processor of claim 10, wherein an identifier for the primitive and a set of one or more vertex indices for the primitive, where each vertex index for the primitive comprises a vertex packet identifier and an identifier for the vertex in the vertex packet, are provided for an assembled primitive.

15. The graphics processor of claim 10, further comprising:

a vertex buffer for storing generated vertex packets for use by later stages of the graphics processing pipeline; and a vertex packet fetching circuit configured to fetch vertex packets into the vertex buffer for use, and evict vertex packets from the vertex buffer, on a vertex packet-by-vertex packet basis.

16. The graphics processor of claim 15, configured to:

track the use of vertex packets in the vertex buffer for assembled primitives, and after it is determined from that tracking that processed vertices in a vertex packet will no longer be required from the vertex buffer for any assembled primitives, evict the vertex packet from the vertex buffer.

17. The graphics processor of claim 15, wherein:

the vertex packet generating circuit is configured to, once it has been determined that all the assembled primitives that will use a vertex packet have been assembled and included in the sequence of assembled primitives, associate an indication of that with the sequence of assembled primitives; and a later stage of the graphics processing pipeline is configured to, when it sees the indication for a vertex packet, signal to the vertex packet fetching circuit that the vertex packet can be evicted from the vertex buffer.

18. A non-transitory computer readable storage medium storing computer software code which when executing on a processor performs a method of operating a graphics processor that executes a graphics processing pipeline to generate an output, in which a set of vertices to be used for primitives to be processed when generating the output, each vertex having associated with it a set of one or more vertex attributes, together with a set of vertex indices referencing vertices in the set of vertices and primitive configuration information indicating how the vertex indices are to be assembled into primitives for processing when generating the output, are provided; the method comprising:

performing a first primitive assembly process to assemble a sequence of one or more of primitives to be processed when generating the output from the set of vertex indices provided for the output based on the primitive configuration information provided for the output, each assembled primitive of the sequence of assembled primitives comprising an identifier for the primitive and a set of one or more vertex indices for the primitive;

generating one or more vertex packets using the vertex indices for the assembled primitives, each vertex packet comprising a plurality of vertices of the assembled primitives;

wherein the generating one or more vertex packets using the vertex indices for the assembled primitives comprises:

allocating vertices for assembled primitives to a vertex packet until a threshold number of vertices have been allocated to the vertex packet; and triggering vertex attribute processing for the vertices of the vertex packet, to thereby generate a vertex packet comprising processed vertex attributes for the vertices of the vertex packet;

and thereafter:

performing a second primitive assembly process to assemble the same sequence of one or more of primitives to be processed when generating the output from the set of vertex indices provided for the output based on the primitive configuration information provided for the output;

generating one or more vertex packets using the vertex indices for the assembled primitives from the second primitive assembly process, each vertex packet comprising a plurality of vertices of the assembled primitives;

wherein the generating one or more vertex packets using the vertex indices for the assembled primitives from the second primitive assembly process comprises:

allocating vertices for assembled primitives to a vertex packet until a threshold number of vertices have been allocated to the vertex packet; and providing the assembled primitives from the second primitive assembly process and the generated vertex packets comprising the processed vertex attributes generated by the first primitive assembly process to later stages of the graphics processing pipeline that is being executed by the graphics processor for processing.

* * * * *